United States Patent [19]

Motoyama et al.

[11] Patent Number: 5,946,908
[45] Date of Patent: Sep. 7, 1999

[54] ENGINE CONTROL AND WALL TEMPERATURE SENSOR

[75] Inventors: Yu Motoyama; Yoshihiko Moriya, both of Iwata, Japan

[73] Assignee: Yamaha Hatsudoki Kabushiki Kaisha, Iwata, Japan

[21] Appl. No.: 08/782,648

[22] Filed: Jan. 14, 1997

[30] Foreign Application Priority Data

Jan. 17, 1996 [JP] Japan ................................ 8-006144
Jan. 18, 1996 [JP] Japan ................................ 8-006907

[51] Int. Cl.⁶ .............................. F02B 27/02; F01N 3/00
[52] U.S. Cl. ................................................ 60/314; 60/276
[58] Field of Search .............................. 60/312, 313, 314, 60/276

[56] References Cited

U.S. PATENT DOCUMENTS

| | | | |
|---|---|---|---|
| 3,788,284 | 1/1974 | Gardner | 60/276 X |
| 3,973,529 | 8/1976 | Wessel et al. | 60/276 X |
| 4,193,965 | 3/1980 | Cullingford et al. | |
| 4,910,960 | 3/1990 | Ueki et al. | 60/312 |
| 5,134,850 | 8/1992 | Saito et al. | 60/313 |
| 5,271,224 | 12/1993 | Cruickshank | 60/312 X |

FOREIGN PATENT DOCUMENTS

| | | |
|---|---|---|
| 0500105 | 8/1992 | European Pat. Off. . |
| 2636371 | 3/1990 | France . |
| 3914264 | 9/1990 | Germany . |
| 35-3123733 | 10/1978 | Japan ...................................... 60/312 |
| 62-186064 | 8/1987 | Japan . |
| 40-4132832 | 5/1992 | Japan ...................................... 60/312 |
| 7-150954 | 6/1995 | Japan . |
| 7-247846 | 9/1995 | Japan . |
| 2190956 | 12/1987 | United Kingdom ..................... 60/314 |

*Primary Examiner*—John E. Ryznic
*Attorney, Agent, or Firm*—Knobbe, Martens, OLson & Bear LLP

[57] ABSTRACT

A number of embodiments of exhaust temperature sensors that cooperate with an exhaust control for maintaining optimum engine performance by controlling the exhaust temperature to maintain the desired pulse back effect on the exhaust system.

18 Claims, 19 Drawing Sheets

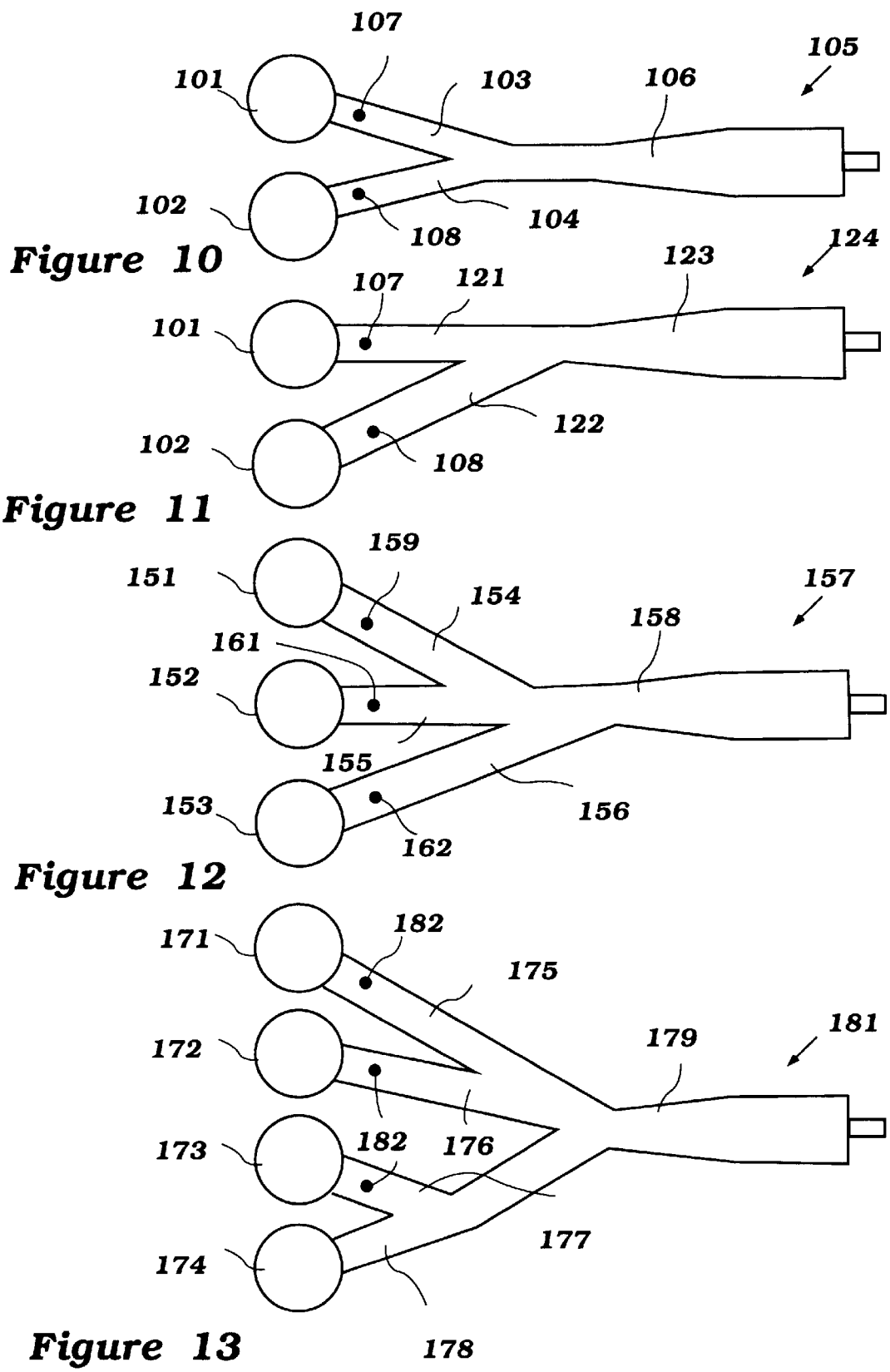

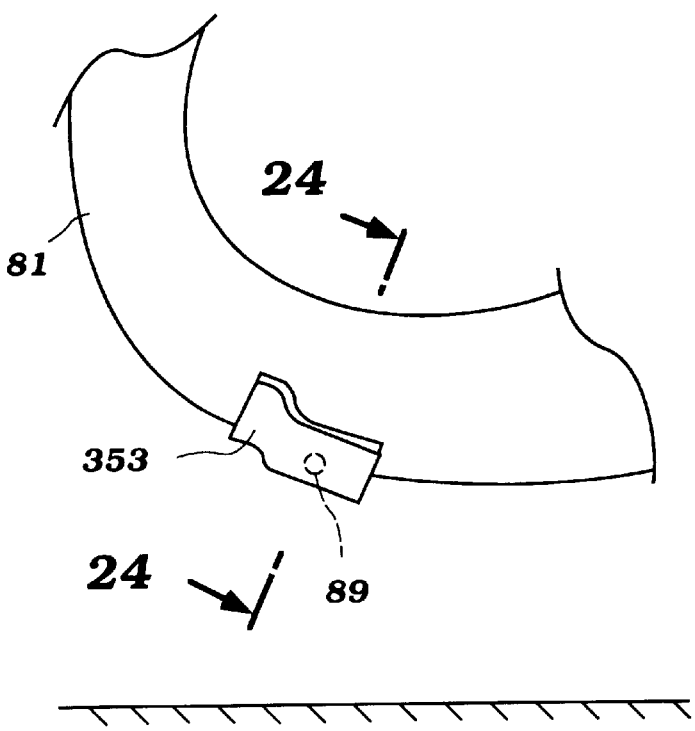
Figure 23
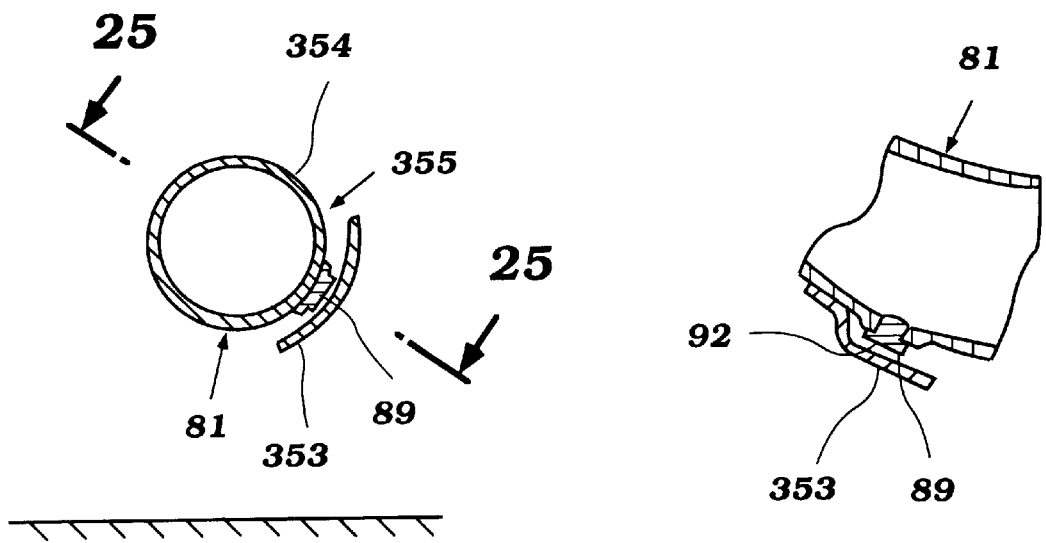
Figure 24
Figure 25

ENGINE CONTROL AND WALL TEMPERATURE SENSOR

BACKGROUND OF THE INVENTION

This invention relates to an engine control and sensor for an engine control and more particularly to an exhaust back pressure effect control and sensor.

It is known that the performance of an internal combustion engine can be significantly affected by the tuning of the exhaust system. If the exhaust system is properly tuned, the pulses which emanate back from the discharge end of the exhaust pipe to the exhaust ports can be tuned so as to occur at an appropriate time so as to improve the engine performance. One way this can be done is by utilizing the pulse back effect to cause any fresh fuel air charge which may have passed out of the exhaust port due to overlap conditions to be forced back into the combustion chamber. This improves the charging efficiency and in effect gives rise to a characteristic known as "exhaust supercharging." That is, the pressure in the combustion chamber can be raised above atmospheric in this manner.

A wide variety of methods and apparatus may be employed for achieving this effect and for varying the effect during the running of the engine. This can be done by placing reflective control valves in the exhaust system, changing the effective length of the exhaust system, adding variable tuning chambers, changing the port opening timing for the engine during its running, and/or changing the time of initiation of combustion in the combustion chamber. These techniques are particularly effective in two cycle engines, but the same concept can be employed with four cycle engines.

This effect can be generated with single cylinder engines, as well as multiple cylinder engines. When functioning in conjunction with multiple cylinder engines, even greater effects can be obtained at times. That is, the exhaust pulses from one cylinder may be utilized to influence the combustion chamber conditions in another cylinder through this pulse back effect if a common exhaust outlet is shared by the cylinders.

It has been found that one accurate measurement that is useful in controlling the pulse back effect is by measuring the temperature of the exhaust gasses. By measuring the exhaust gas temperature, it is possible to obtain the desired condition in the combustion chamber through the manipulation of the pulse back effect through the aforenoted methods and other methods which may be utilized to achieve the same result. Exhaust gas temperature affects the velocity of the pulse in the exhaust pipe.

However, it is important that the sensor that is utilized does not actually sense the direct temperature of the exhaust gasses. There is a number of reasons for this. First, the exhaust gas temperature fluctuates quite widely and if the actual instantaneous exhaust gas temperature were measured, there would be wide fluctuations in the control and uneven engine performance would result.

It has been proposed therefore to utilize a sensor that senses the average exhaust gas temperature by measuring the temperature in the exhaust pipe and specifically measuring the wall temperature of the exhaust pipe. This temperature also accurately reflects the actual exhaust gas temperature but the pipe temperature does not fluctuate as widely as the actual exhaust gas temperature does. As a result, more stable control can be obtained and the control is in fact more accurate.

The exhaust pipe walls, however, do not themselves necessarily maintain a constant or representative temperature at all places. For example, in many engine applications, the exhaust port is served by an exhaust pipe which must curve in order to clear the engine and other components to connect to the remainder of the exhaust system. Frequently the configuration of the exhaust system frequently results in the formation of a number of curves or bends. It has been discovered in conjunction with one feature of the invention that the actual positioning of the sensor element in the wall of the exhaust system is significant in the system performance, particularly if the sensor is mounted in a place where the exhaust system curves.

If the sensor is positioned in or near a curve in the exhaust system the exhaust flow may directly impinge on the sensor. In such cases the sensor will be sensing, at least partially, the gas temperature rather than the wall temperature. Hence, the control may become erratic.

It is therefore a principal object of this invention to provide an improved exhaust sensor for an engine that will provide an accurate and stable exhaust temperature signals.

It is a further object of this invention to provide an improved exhaust sensor placement arrangement for an engine exhaust effect control wherein the sensor will provide good and accurate sensor information.

In addition to the importance of having the sensor element be positioned in the appropriate portion of the wall of the exhaust system, other aspects of the sensor are also important in conjunction with its accuracy.

Basically, the temperature sensors comprise a sensor element end that is mounted in contact with the appropriate portion of the exhaust system wall and a terminal end from which the signal is transmitted to the control system. Obviously, the terminal end must extend outwardly from the exhaust system.

This condition gives rise to other problems that may affect the accuracy of the control. For example, in many forms of vehicle application, the sensor element may be disposed in direct or close contact with the atmosphere. Such things as rain, moisture or changes in ambient temperature can therefore affect the accuracy of the sensor. That is, if the terminal end is at a substantially different temperature from the sensor end and/or if the temperature at the terminal end fluctuates widely, then the accuracy of the sensor can be compromised.

In addition to this problem, if the terminal end is disposed in an outwardly protruding position, there is always the danger that it may be struck by a foreign object or inadvertently struck and damaged.

It is, therefore, a further object of this invention to provide an exhaust temperature sensor mounting arrangement for an engine control wherein the terminal end is disposed so as to avoid the aforenoted problems.

It is, therefore, the principal object of this invention to provide an improved and highly accurate exhaust system temperature sensor for an internal combustion engine wherein accurate and representative signals can be generated and transmitted to the control with accuracy.

SUMMARY OF THE INVENTION

This invention is adapted to be embodied in an internal combustion engine having at least one combustion chamber in which combustion occurs. An exhaust system is provided for discharging exhaust gasses from the combustion chamber through an exhaust port to the atmosphere through an exhaust system discharge opening. Exhaust effect control means are provided for effectively changing the timing of reflected exhaust gas pulses upon the exhaust port. An exhaust temperature sensor having a detecting end for detecting temperature and a terminal end spaced from the detecting end is provided for transmitting a control signal to the exhaust effect control means. Means are provided for mounting the exhaust temperature sensor in the exhaust system for sensing the temperature of a wall thereof by the detecting end without experiencing conditions that would cause false signals to be transmitted from the terminal end to the exhaust effect control means.

In accordance with one facet of the invention, this result is obtained by positioning the sensor end in a curved portion of the exhaust system where the exhaust gasses will not directly impact upon it because of the curvature.

In accordance with another structure for achieving the desired effect, the terminal end is mounted in a protected area so as to avoid temperature changes from atmospheric conditions and to avoid damage to the terminal end to occur which would adversely affect its performance.

BRIEF DESCRIPTION OF THE DRAWINGS

FIGS. 10 through 13 show schematically types of exhaust systems with which the invention can be utilized;

FIG. 10 shows a two cylinder embodiment;

FIG. 11 shows another two cylinder embodiment;

FIG. 12 shows another type of three cylinder embodiment;

FIG. 13 shows a four cylinder embodiment.

FIG. 23 is a side elevational view of a specific embodiment and shows a portion of the exhaust system.

FIG. 24 is a cross sectional view taken along the line 24—24 of FIG. 23.

FIG. 25 is a cross sectional view taken along the line 25—25 of FIG. 24.

DETAILED DESCRIPTION OF THE PREFERRED EMBODIMENTS OF THE INVENTION

Figure 1:
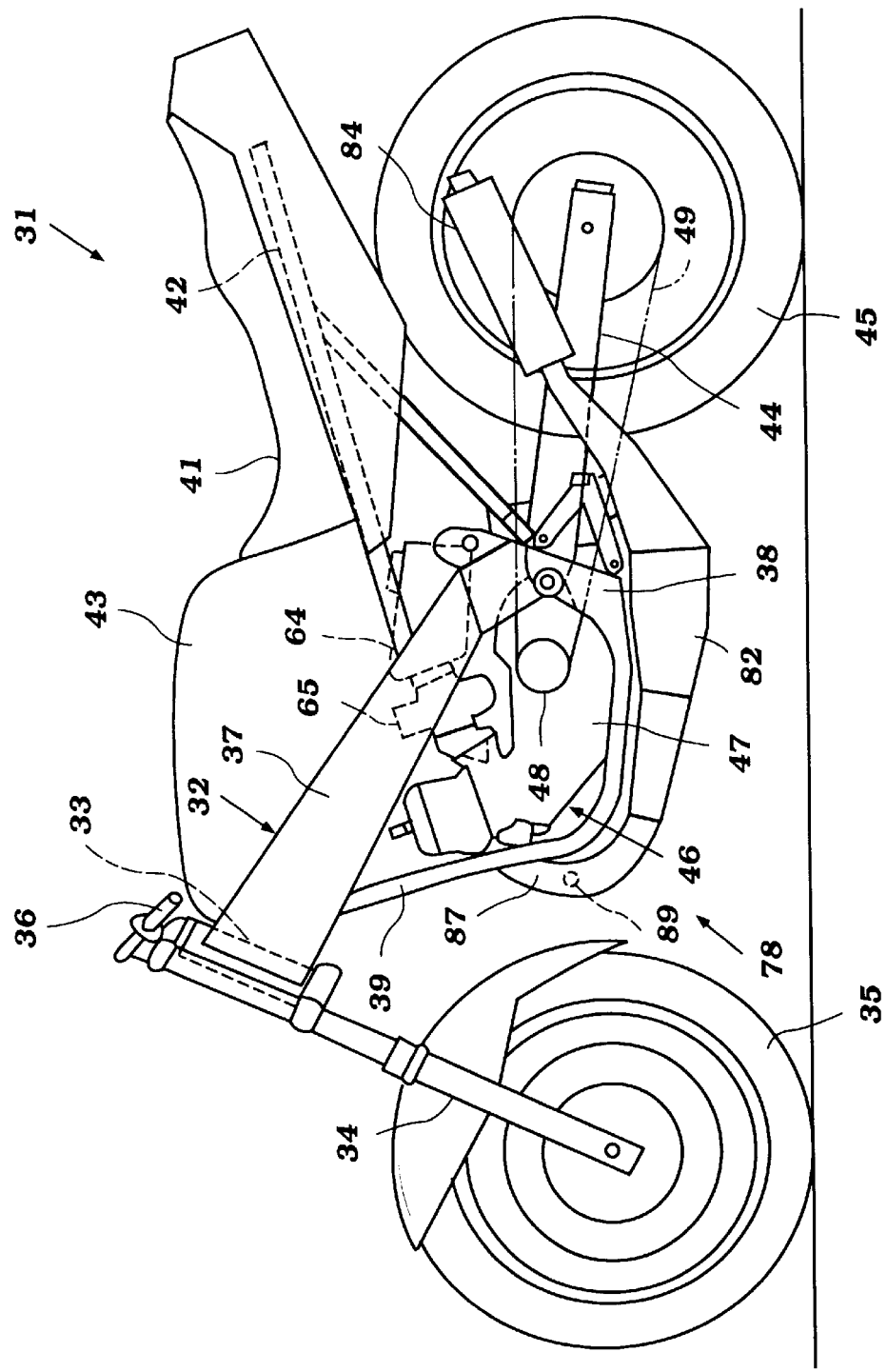
FIG. 1 is a side elevational view of a motorcycle constructed in accordance with a first embodiment of the invention.

Referring first to FIG. 1 of the embodiment of FIGS. 1 through 7, a motorcycle constructed in accordance with this embodiment of the invention is identified generally by the reference numeral 31. The invention is described in conjunction with a motorcycle such as the motorcycle 31 because the invention has particular utility in conjunction with vehicles such as motorcycles wherein large portions of the vehicle and its power plant and exhaust system are exposed to the atmosphere. Also, a motorcycle is a typical embodiment in which the invention can be utilized because motorcycles frequently employ two cycle engines and the invention has particular utility with such engines. Of course, it will be readily apparent to those skilled in the art that the invention can be utilized with a wide variety and type of applications for engines of varying types and powering varying types of loads.

The motorcycle 31 is comprised of a frame assembly 32 that includes a head pipe 33. This head pipe 33 journals a front fork assembly 34 which, in turn, suspends a wheel 35 for suspension and dirigible movement relative to the head pipe 33. The front fork 34 is steered by a handlebar assembly 36 in any well known manner.

Continuing to describe the frame assembly 32, it includes a main frame member 37 that depends downwardly and rearwardly for juncture with a rear suspension casing 38. A down tube 39 also extends downwardly and rearwardly from the main frame member 37 and is joined to the rear suspension casing 38 at its rear end.

A seat 41 is supported on a seat stay 42. A fuel tank 43 is disposed on the main frame member 37 between the head pipe 33 and the rider's seat 34.

The rear suspension casing 38 journals a trailing arm 44 in a known manner. A rear wheel 45 is rotatably journalled at the end of the trailing arm 34. A suspension unit (not shown) is loaded upon pivotal movement of the trailing arm 44 to cushion the ride of the motorcycle 31.

An internal combustion engine, indicated generally by the reference numeral 46 is supported in the frame assembly 32 in a known manner. As is well known in motorcycle practice, the engine 46 has a combined crankcase change speed transmission assembly 47 at its lower end. This drives an output sprocket 48 at rider selected speed ratios. The sprocket 48 drives a chain 49 for driving the rear wheel 45 in a well known manner.

The invention deals primarily with the engine 46 and the exhaust system therefor. For that reason, further description of the motorcycle 31 is not believed to be necessary to permit those skilled in the art to practice the invention. As has also previously been noted the invention can be utilized with a wide variety of types of vehicles and other loads driven by internal combustion engines.

Figure 2:
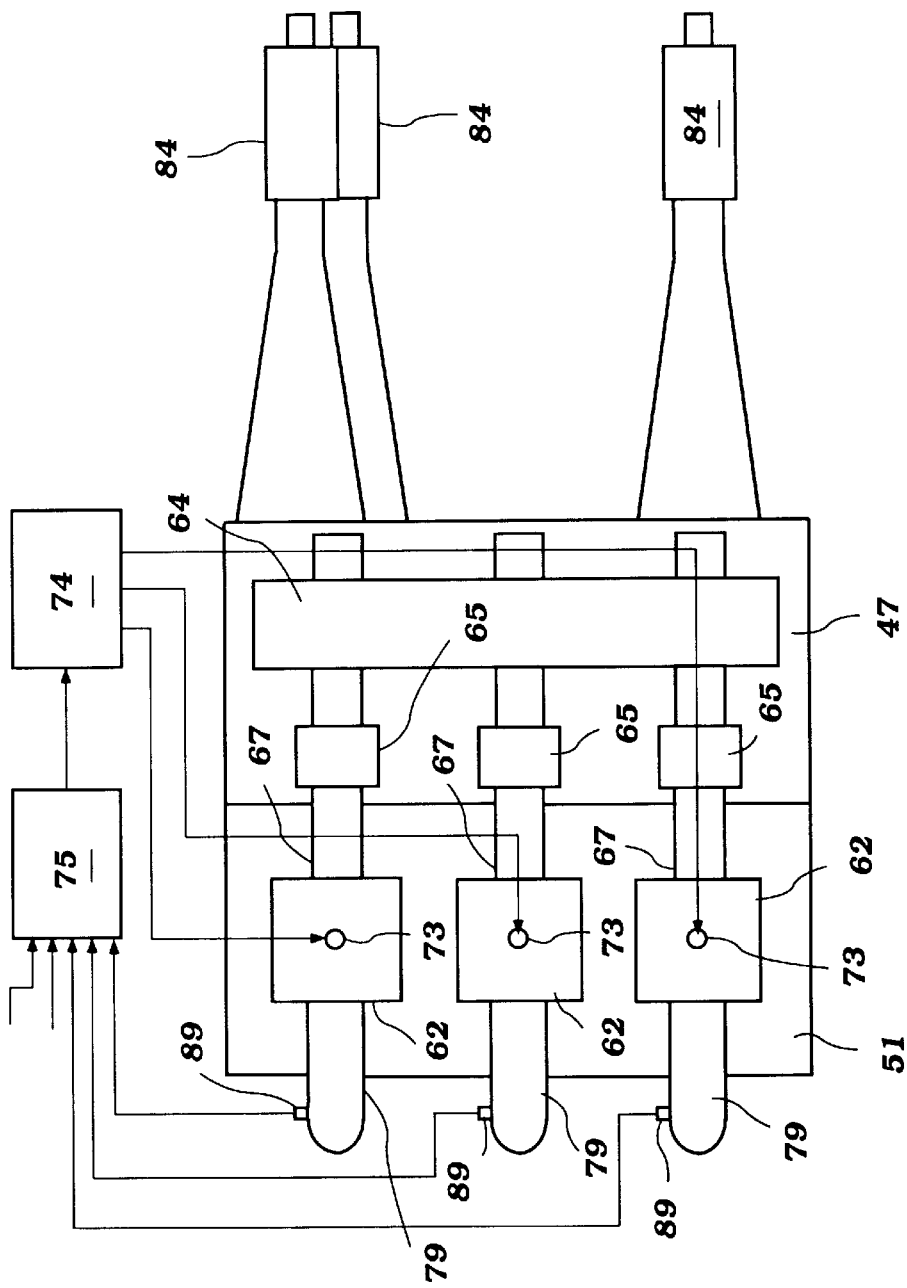
FIG. 2 is a top plan view in partially schematic form showing the engine including its induction and exhaust systems.
Figure 3:
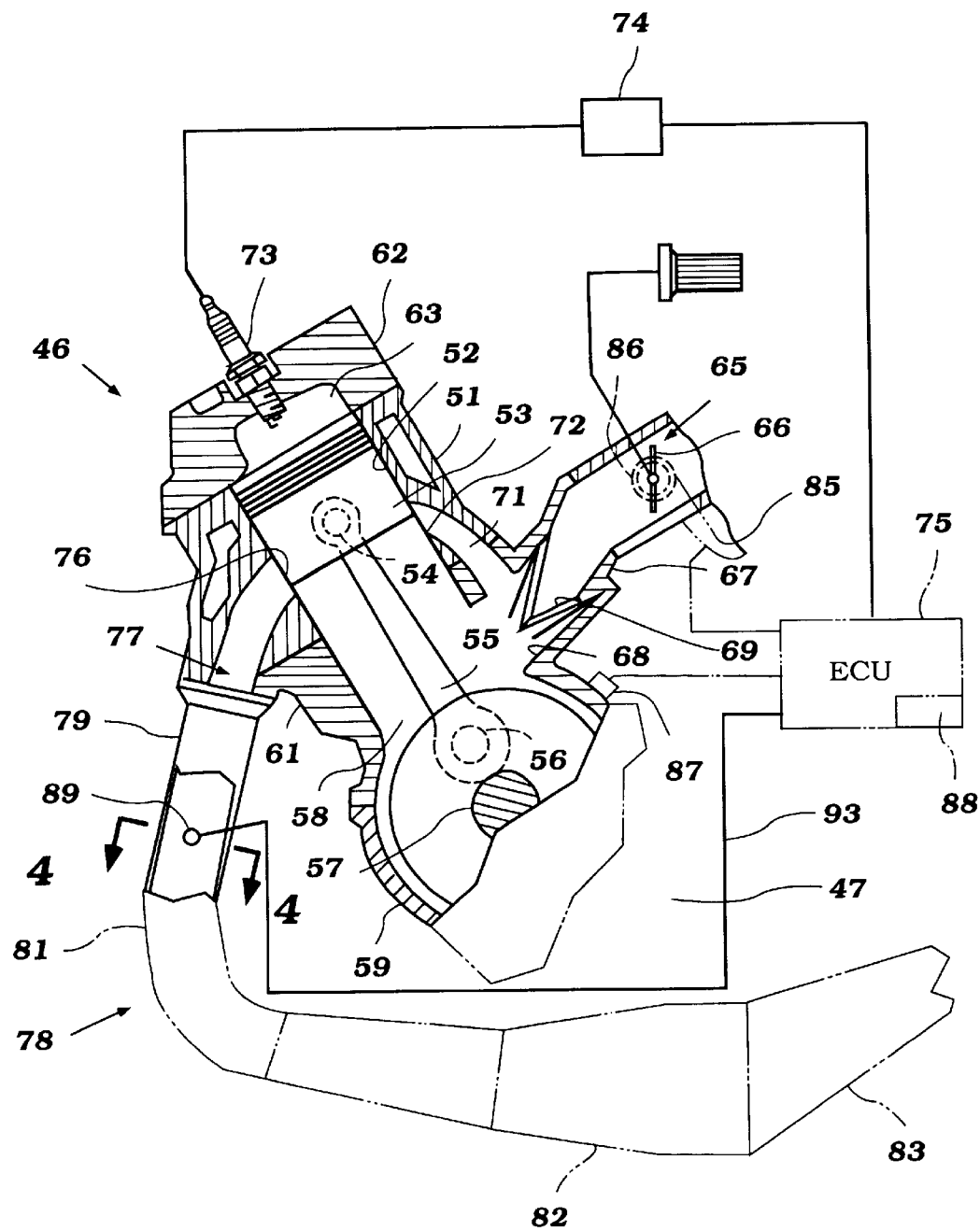
FIG. 3 is a cross sectional view taken through one cylinder of the engine of the motorcycle with portions of the exhaust system shown in phantom and certain of the control elements shown schematically.

Referring now additionally to FIGS. 2 and 3, the engine 46 is depicted in this embodiment as being of the in-line three cylinder type operating on a two stroke crankcase compression principle. For the reasons already noted, it will be apparent to those skilled in the art how the invention can be utilized with engines having other cylinder numbers and other cylinder configurations. Some other cylinder arrangements will be described by certain embodiments later and also the application of the principles of the invention to a four cycle engine will also be described later.

The engine 46 includes a cylinder block 51 in which three aligned cylinder bores 52 are formed. FIG. 3 is a cross section through one of the cylinder bores and in this figure it will be seen that a piston 53 is supported for reciprocation in each cylinder bore 52. Each piston 53 is connected by means of a piston pin 54 to the upper or small end of a connecting rod 55. The lower or big end of the connecting rod 55 is journalled on a respective throw 56 of a crankshaft 57.

The crankshaft 57 is rotatably journalled within a crankcase chamber 58 formed by the skirt of the cylinder block 51 and a crankcase member 59 that is affixed thereto. In the illustrated embodiment, the skirt of the cylinder block is formed from a separate piece and this is indicated by the reference numeral 61. As is typical with two cycle crankcase compression engines, the crankcase chamber 58 and specifically the sections of it associated with each of the cylinder bores 52 is sealed from the others.

A cylinder head assembly 62 is affixed to the upper end of the cylinder block 51 in closing relationship with the cylinder bores 52. The cylinder head 62 is formed with individual recesses 63 which cooperate with the cylinder bores 52 and the heads of the pistons 53 to form the combustion chambers of the engine. At times these recesses 63 will be referred to as the "combustion chambers". This is because at top dead center position, the cylinder head recesses 63 form the substantial portion of the clearance volume of the engine 46.

An induction system is provided for supplying a charge to the engine crankcase chambers 58. This induction system includes an air inlet device 64 that is mounted beneath the fuel tank 43 and which draws atmospheric air through one or more inlets. This air inlet device 64 serves charge formers 65. In the illustrated embodiment, the charge formers 65 are of the sliding piston throttle type carburetor. It will be apparent, however, that the invention can be utilized in conjunction with other forms of charge formers including fuel injection systems, either manifold or direct injected type.

Although the carburetors 65 are described as being of the sliding piston throttle type, butterfly type throttle valves are schematically shown at 66 for controlling the flow through the flow passages of the individual carburetors 65.

These flow passages communicate with intake manifolds 67 which deliver the formed fuel air charge to the crankcase chambers 58. This charge is delivered through intake ports 68 formed in the upper crankcase member 61. Reed type check valves 69 are positioned within these intake ports 68 so as to permit the charge to enter the crankcase chamber 58 when the respective piston 53 is moving upwardly.

As the piston 53 moves downwardly, the reed type check valves 69 will close and the charge in these crankcase chamber sections 68 will be compressed. The compressed charge is transferred to the area above the pistons 53 through one or more scavenge passages 71. These scavenge passages 71 terminate in scavenge ports 72 which are opened and closed by the movement of the piston 53, as is well known in this art.

The charge which has been delivered to the combustion chambers 63 through the scavenge passages 71 and scavenge ports 72 will be futrther compressed as the pistons 53 move upwardly in the cylinder bores 51. At an appropriate time, spark plugs 73 mounted in the cylinder heads 62 will be fired by an ignition system 74 which is controlled by an ECU 75. A control strategy for firing of the spark plugs 73 by the ignition system 74 will be described later.

When the spark plugs 73 are fired, the compressed charge in the combustion chamber 63 will ignite, burn and expand to drive the pistons 53 downwardly. Eventually, one or more exhaust ports 76 will be opened so as to permit the exhaust gasses to exit through exhaust passages 77 that extend through the cylinder block 51. It should be noted that these exhaust passages 77 extend from the exhaust ports 76 forwardly and downwardly in the orientation of the motorcycle 31. The exhaust gasses are then delivered to respective exhaust systems for each cylinder, indicated generally by the reference numeral 78.

In this embodiment, the exhaust system 78 is comprised of separate exhaust system for each cylinder of the engine 46. That is, each cylinder block exhaust passage 77 communicates with a separate exhaust system 78. Each exhaust system has substantially the same construction although their configuration is different because of the transverse placement of the engine 46 in the motorcycle frame 32.

Referring specifically to FIGS. 1–3, each exhaust system 78 includes a first exhaust pipe 79 which extends generally forwardly and downwardly and defines what constitutes ar extension of the cylinder block exhaust passage 77. Toward the lower end of the section 79, there is provided a curved section 81 which curves below the combined crankcase transmission assembly 47 of the engine and then extends rearwardly to an expansion chamber device 82. The expansion chamber device 82 is disposed generally beneath the crankcase transmission assembly 47.

Each expansion chamber device 82 then terminates in a tailpipe 83 which extends upwardly and rearwardly and which terminates in a respective muffler 84. As may be seen in FIG. 2, one of the mufflers 84 is disposed on one side of the rear wheel 45. The remaining two mufflers 84 are disposed in side-by-side relationship on the opposite side of the rear wheel 45.

By utilizing separate exhaust systems for each cylinder, it is possible to tune the exhaust systems for the pulse supercharging of their reflected pulses without considering or compensating for pulses occurring from other cylinder. As will become apparent by description to certain other embodiments, such arrangements are not necessarily required and that the exhaust system may include a common outlet. However, the invention does have particular utility in conjunction with exhaust systems where each cylinder has its own exhaust outlet.

The control system for controlling the engine 46 will now be described first by reference to FIGS. 1–4 wherein the various sensors are depicted in actual form and then later by reference to FIGS. 5–7 wherein the interrelationship between the sensors and the controls are illustrated and will be described.

As previously noted, the ECU 75 controls the timing of firing of the spark plugs 73. This timing is selected in a manner to provide optimum engine performance and this includes timing of the firing of the spark plugs 73 so as to maintain the optimum exhaust back pressure pulse transmission signals.

In addition to controlling the timing of firing of the spark plugs 73 by their ignition system 74, the ECU also controls the fuel supply amount transmitted from the carburetor 65 by a fuel supply control system, indicated schematically at 85 in FIG. 1.

Certain engine running signals are also transmitted to the ECU 75 as well as other conditions such as ambient air pressure and temperature. The depicted controls include a throttle position detector 86 that cooperates with the throttle valve 66 to provide a signal indicative of operator demand. There is also a sensor 87 associated with the crankshaft 57 so as to provide a pulse signal that it is indicative of not only crank angle but, by measuring crank angle with respect to time, engine speed. The ECU 75 has a memory section 88 that contains certain map information, as shown in FIG. 7, so as to provide the necessary information lo the ECU 75 to obtain optimum engine control.

Figure 4:
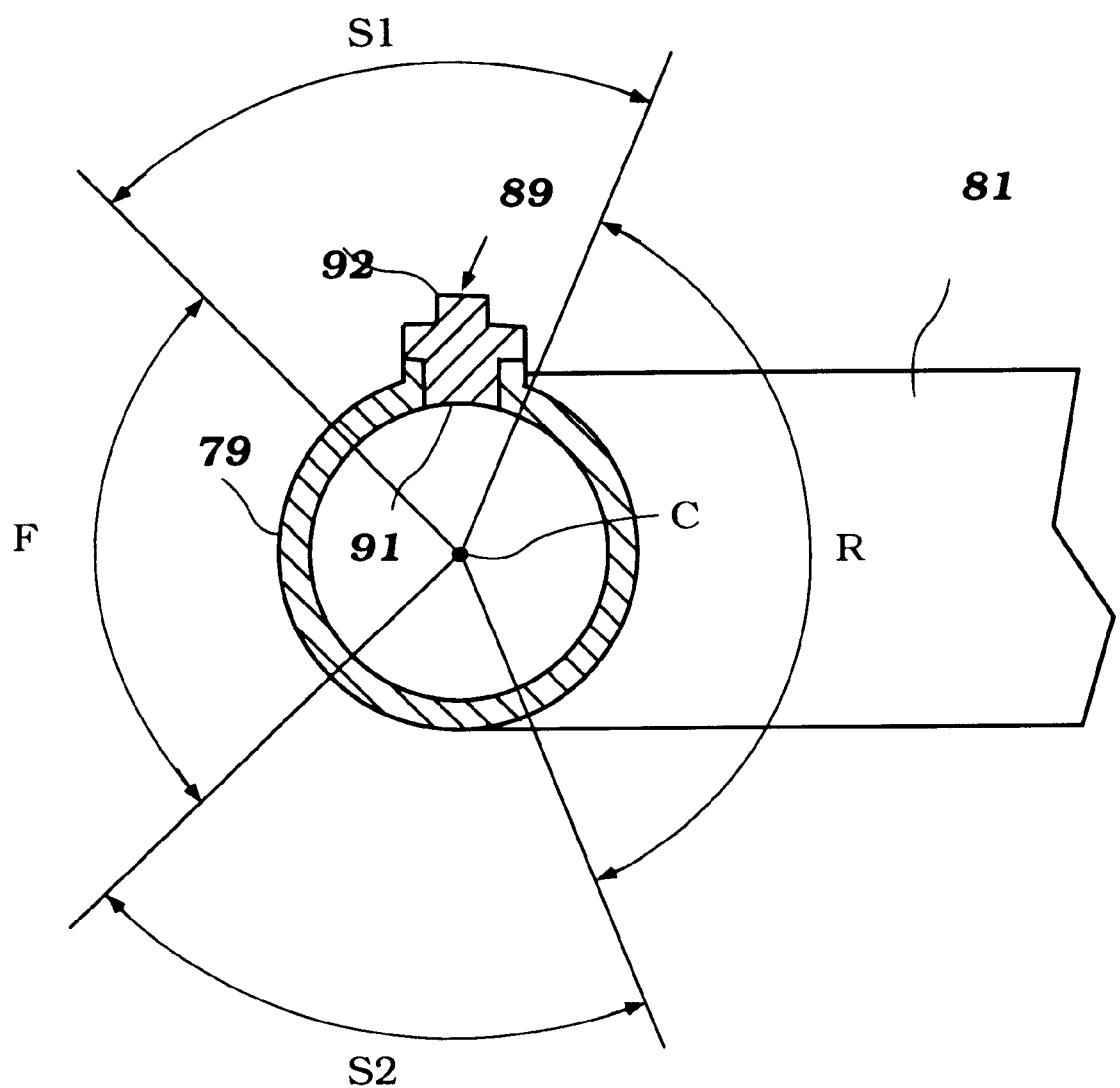
FIG. 4 is a cross sectional view taken along the line 4—4 of FIG. 3 and shows the potential sensor locations in accordance with an embodiment of the invention.

Finally, an in connection with a important feature of the invention, there is provided an exhaust pipe wall temperature sensor 89 which is mounted in a particular location as shown in FIG. 4. This sensor 89 is comprised of a sensor end portion 91 that is flush with a wall of the exhaust pipe portion 79 and a terminal end 92 that is connected to an electrical conductor which transmits its signals, as indicated by the line 93 to the ECU.

Rather than sensing the exhaust temperature directly, it is more important to sense the wall temperature because it does not receive the extreme fluctuations that the exhaust gasses themselves encounter. As has been aforenoted, these fluctuating signals do not provide good control because they provide high degrees of hunting.

Therefore, in accordance with the invention the wall type sensor is utilized. However, because of the fact that the exhaust system 78 must bend and curve around the crankcase transmission assembly 47 it is important to position the sensor 89 in an area where it will not be impacted upon directly by the flowing exhaust gases as would be true if placed in areas indicated at the area F in FIG. 4. This is the areas where the exhaust gases may directly strike the. Preferably, the sensor 89 is provided in one of the areas S1 or S2 where they will be clear of direct exhaust gas impingement but will nevertheless sense the wall temperature. The sensor 89 may also be placed on the inside of the curve in the area R. These domains F, R, S1 and S2 are defined around the center C of the portion of the exhaust pipe 79 where the sensor 89 is positioned.

Figure 5:
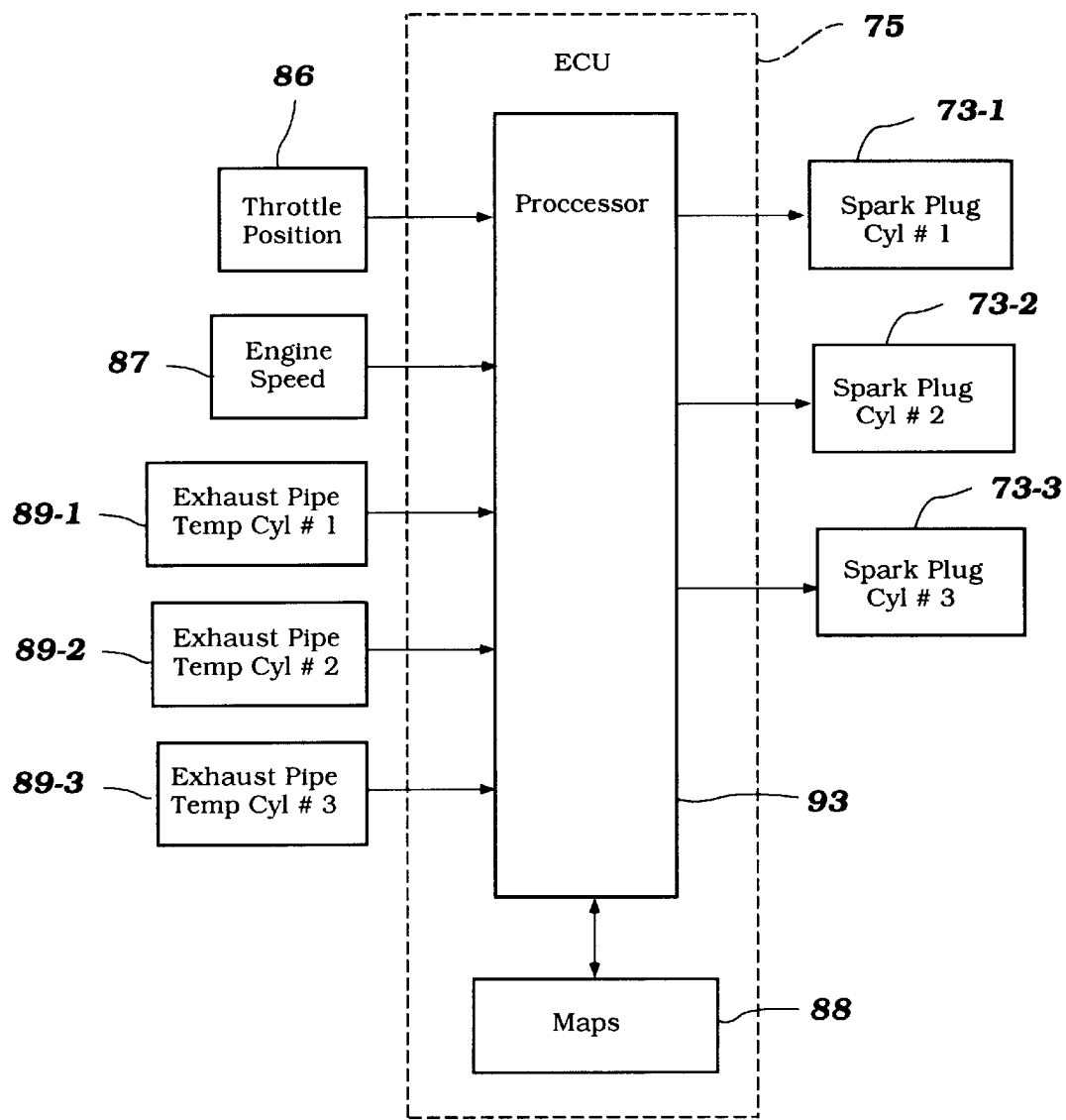
FIG. 5 is a schematic block diagram showing the systems of the engine control.

As may be seen in FIG. 5, the ECU 75 includes, in addition to the map memory 88, a processor, indicated schematically at 93. The outputs of the throttle position sensor 86 and engine speed sensor 85 are transmitted to this processor 93 as is the exhaust pipe temperature from the sensors 89 associated with each cylinder. The cylinders are indicated respectively by the suffixes 1, 2 and 3 to correspond to the cylinder numbering.

In a like manner, the outputs to the spark plugs 73 are also designated in the same manner for the respective cylinders. Hence, the spark timing for each cylinder may be varied independently of the others in order to maintain the desired exhaust pipe back pressure conditions or pulse back conditions as determined by the exhaust pipe wall temperature, throttle position, and engine speed. The actual control routine will now be described by reference to FIG. 6 and the map of FIG. 7.

In this embodiment, as has been noted, the exhaust reflection back effect is controlled dependent upon the sensing of its temperature from the temperature sensors 89 to maintain the desired optimum effect by changing spark timing. As has been described previously and as will be described later, various other ways of controlling the temperature can be employed or combinations thereof.

Figure 7:
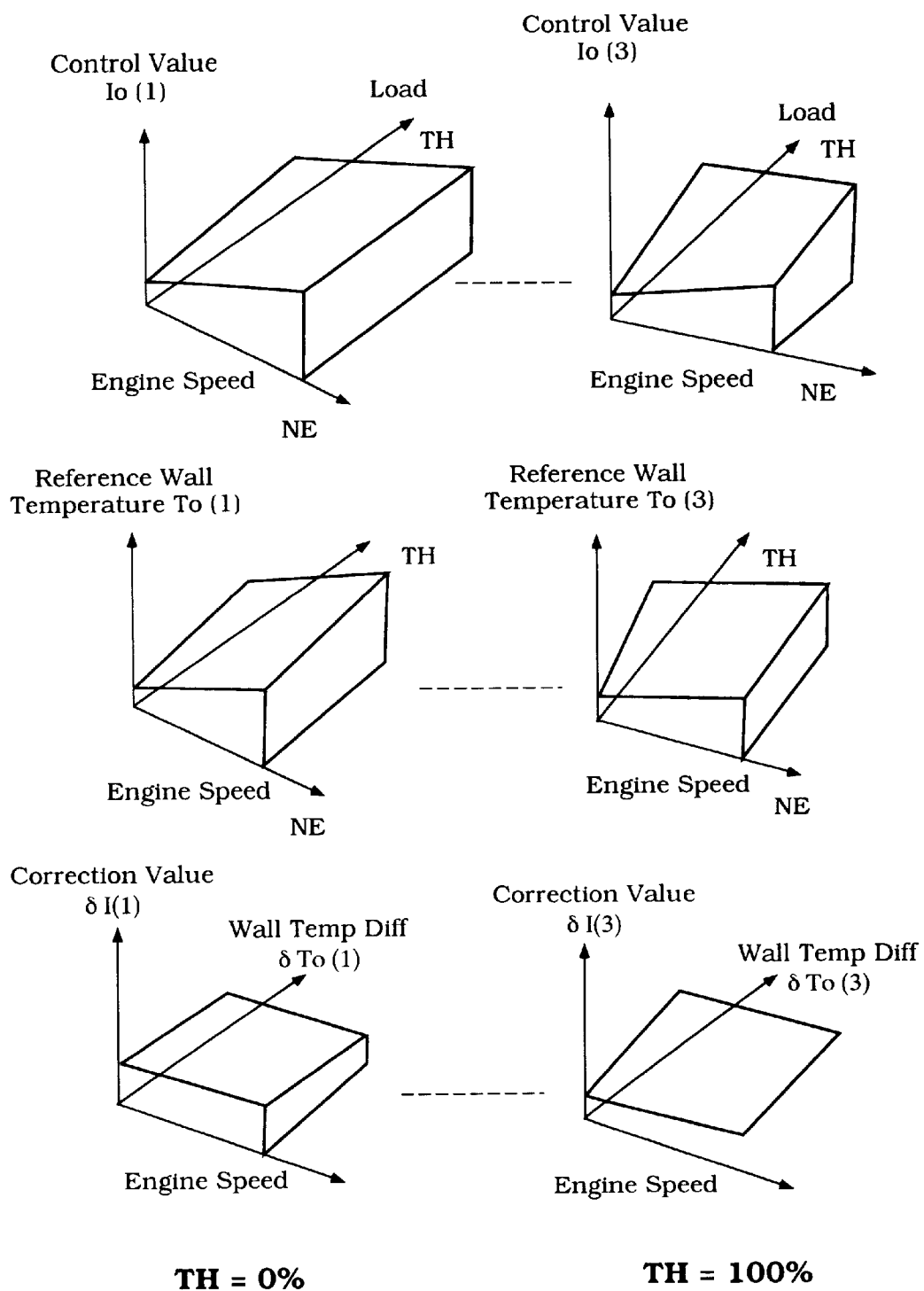
FIG. 7 is a series of three dimensional maps retained in the control memory.

FIG. 7 shows various maps that provide the reference control signals. There is provided a first basic control signal $I_O$ for each cylinder which is based upon the three dimensional maps shown at the top of FIG. 7 and which provide a value indicative of the initial control value $I_O$ for the respective cylinders 1, 2 and 3. Only the first and last maps are shown but it will be obvious to those skilled in the art from the type of map for the remaining cylinder.

The throttle opening TH and engine speed NE are depicted on this map. It should be noted that although throttle opening and engine speed are employed, other ways of sensing load may be utilized.

Different maps are employed for each cylinder because, as previously noted, it is difficult to maintain actual uniformity between the design characteristics of each cylinder because of temperature differences, etc. Therefore, each cylinder is provided with its respective map.

As seen at the lower portion of FIG. 7, there is provided a third series of maps this being a series that deals with the corrective factor δ I for changing the timing for each cylinder depending upon the difference between the actual detected wall temperature and the reference temperature TO for the given cylinders. These values are based upon the engine speed and a map as provided for each throttle opening or range of throttle openings from close throttle TH=0% to full throttle opening TH=100% again, bearing in mind the engine speed.

Figure 6:
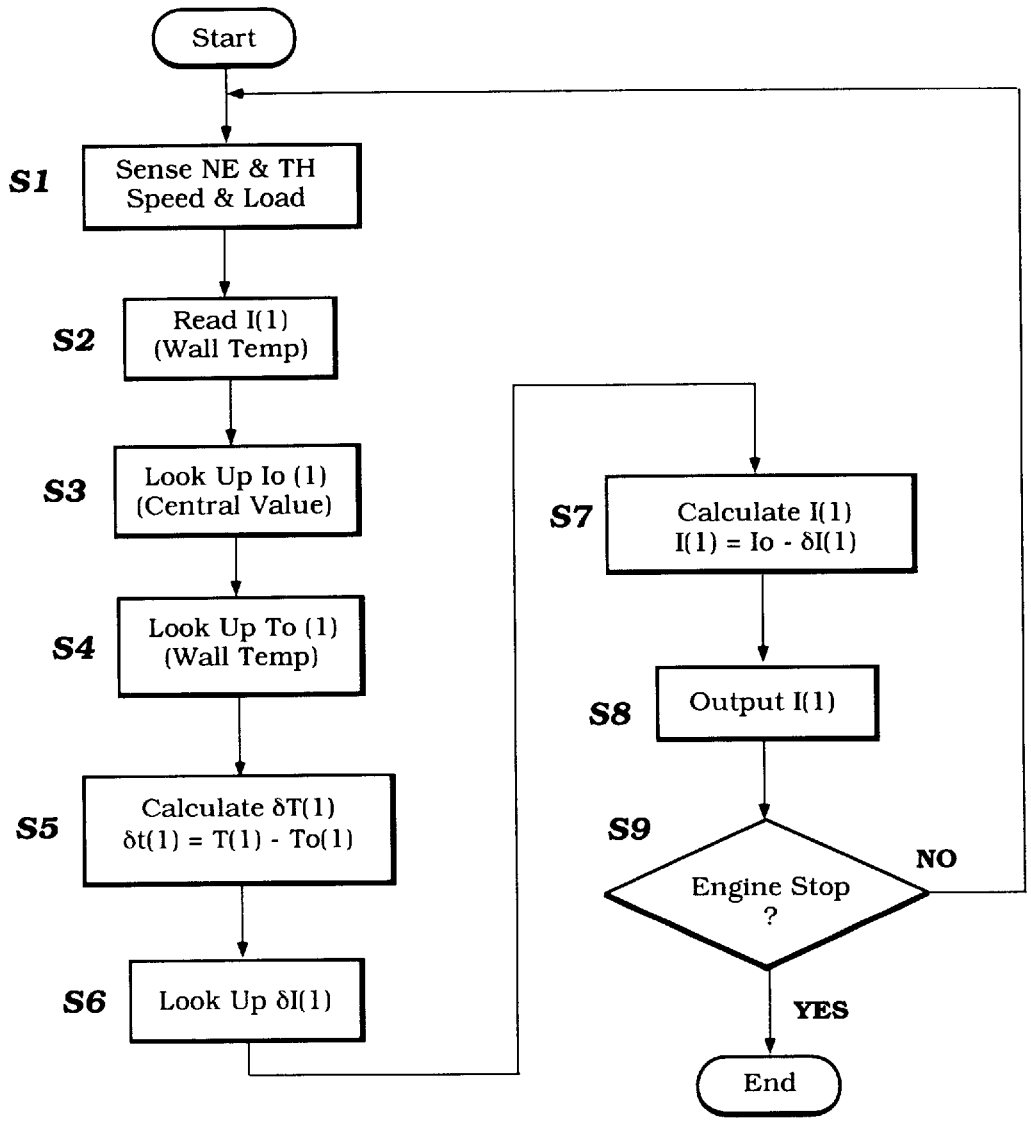
FIG. 6 is block diagram showing the control routine for engine control.

Thus, the program operates in accordance with the control routine as shown in FIG. 6. This control routine represents the control routine for each cylinder. How the control routines are executed for the individual cylinders in their firing sequences will be described later.

In FIG. 6, the program starts at the step S1 wherein it measures the instantaneous engine speed NE as determined from the output of the speed sensor 87 and throttle angle position TH as sensed by the throttle position sensor 86. The program then moves to the step S2 so as to read the wall temperature T1 of the respective cylinder, cylinder 1 being depicted in FIG. 6. The program then moves the step S3 to look up the value $I_O$ from the maps at the upper portion of FIG. 7 for the respective cylinder based upon the sensed engine speed NE and load TH.

The program then moves to the step S4 to look up the reference wall temperature To for the respective cylinder from the maps shown at the center portion of FIG. 7.

The program then moves to the step S5 where the ECU processor portion 93 calculates δ T1 which is obtained by subtracting the desired wall temperature T1 from the actual wall temperature To. It should be understood that the wall temperature may be either below or higher than the desired wall temperature and hence, the δ T figure for the respective cylinder can be a negative number and the maps of FIG. 7 are designed so as to utilize this concept.

The program then moves to the step S6 to look up from the maps of the lower portion of FIG. 7 the corrective value of the control value δ I for the cylinder based on the map of the wall temperature difference δ To and engine speed. As previously noted, throttle opening is also employed by selecting which map will be read.

The program then moves to the step S7 where the processor 93 calculates the actual timing at which the spark plug 73 should be fired so as to obtain the desired wall temperature. This may be either at an advance or retardation in the spark timing. By retarding the firing of the spark plug, a hotter charge will pass through the exhaust system and wall temperature will be elevated while advancing the spark firing will reduce the wall temperature.

This calculation is made by taking the corrective value δ I and adding it to the control value $I_O$. Again, this may be a negative value as noted. The program then moves to the step S8 so as to actually output the spark timing signal for firing the spark plug for the respective cylinder. The program then moves to the step S9 to assure that the engine has not been stopped and if it has not the program repeats. If the engine has been stopped, then the program obviously ends.

Figure 8:
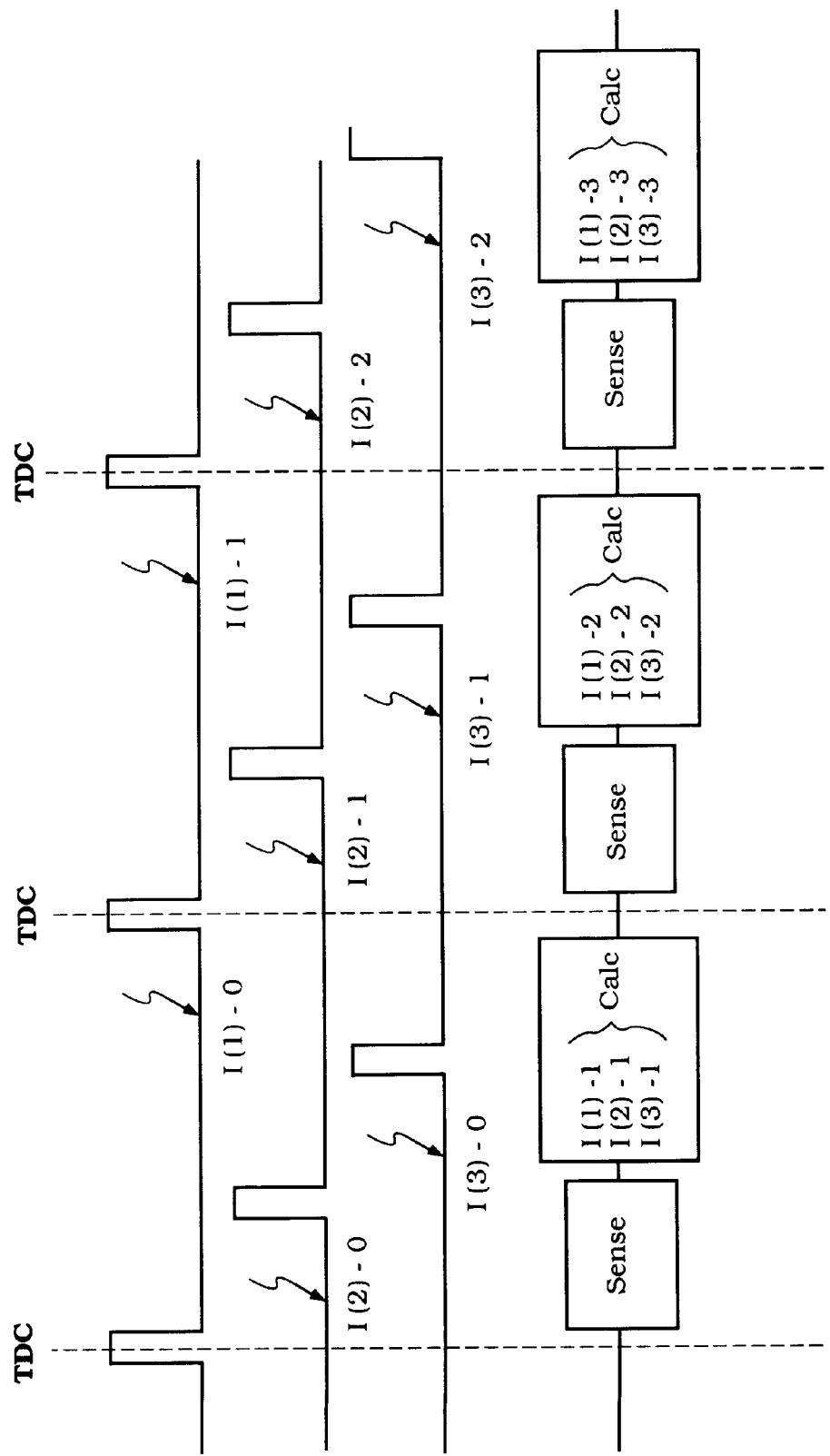
FIG. 8 is a graphical view showing one control routine.

Since each cylinder is controlled independently of the other from its respective maps and controls, the timing of performing the calculations as described in accordance with the control routine of FIG. 6 can be carried on in a variety of ways. For example, and as shown in FIG. 8, the sensing and subsequent timing calculations may be conducted simultaneously for all cylinders in a somewhat parallel fashion beginning at a given time such as the timing of top dead center of the No. 1 cylinder. That is, at a given time all of the sensing and subsequent calculations are made for each cylinder simultaneously and then the adjustments in actual firing of the spark plugs 73 is adjusted in accordance with their firing order, the firing order 123 being depicted.

Figure 9:
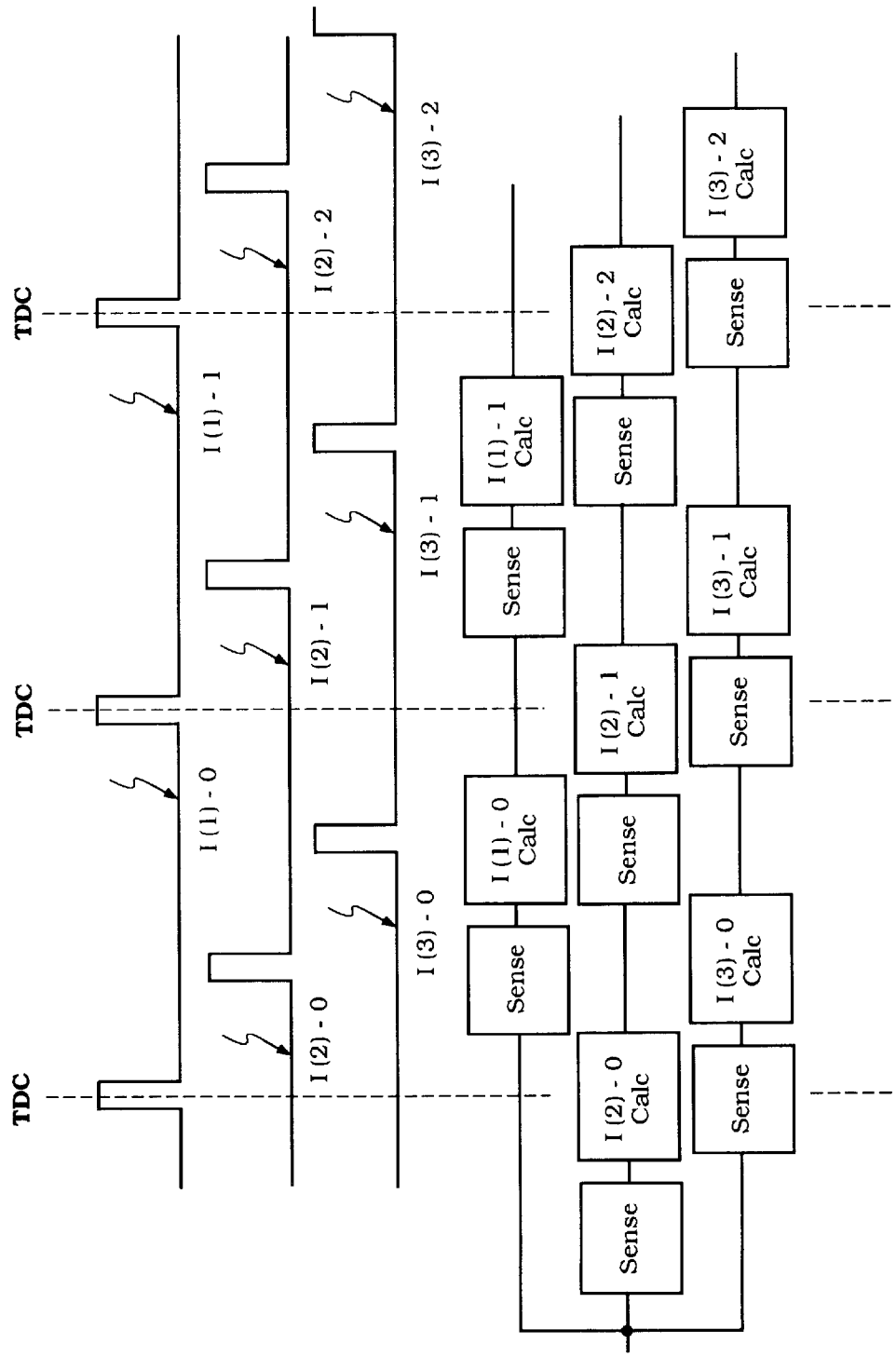
FIG. 9 is a graphical view, in part similar to FIG. 8, showing another control routine.

On the other hand, these calculations may be carried out in a somewhat sequential fashion first performing the sensing for one cylinder then another and then the remaining cylinder. There may be some overlapping in the steps for each cylinder as shown in FIG. 9. That is, the first cylinder may collect the data and then while the calculations and outputs are made for that cylinder the next cylinder can be detected and so on.

In the embodiment of the invention as thus far described, each cylinder has been provided with its own exhaust pipe each having its own individual discharge end. However, the invention may be utilized in conjunction with engines having cylinders which share a common exhaust pipe discharge.

For example, as shown in FIG. 10, an engine is provided with two cylinders 101 and 102 each of which has a respective exhaust port which communicates with a respective branch pipe 103 and 104 of an exhaust system, indicated generally by the reference numeral 105. This exhaust system has a common section 106 serving the branch pipes and which terminates at an atmospheric discharge end. There may be provided a sensor 107 and 108 in each of the individual sections 103 and 104 so as to obtain the optimum results for the cylinders 101 and 102.

FIG. 11 shows a similar embodiment but unlike the embodiment of FIG. 10, the branch sections, indicated here by the reference numerals 121 and 122 are of different shape and different length but serve a common discharge end 123 of a system, indicated generally by the reference numeral 124. The sensors 107 and 108 may be appropriately positioned in the branch sections 103 and 104.

FIG. 12 shows a three-cylinder engine arrangement with cylinders 151, 152 and 153 each of which has exhaust ports served by a respective branch section 154, 155 and 156 of an exhaust system, indicated generally by the reference numeral 157. These branch sections 154, 155 and 156 are served by a common atmospheric air discharge section 158 although they enter it at different locations. Individual sensors 159, 161 and 162 are provided in each branch pipe section 154, 155 and 156.

FIG. 13 shows a four-cylinder arrangement wherein the cylinders 171, 172 and 173, 174 branches are served by respective branches 175, 176 and 177, 178. These branches merge into common sections that are served by a single exhaust pipe 179 of this exhaust system which is indicated generally by the reference numeral 181.

In this embodiment, there may be provided sensors in all or only some of the exhaust branches 175, 176, 177 and 178. If it is known that one branch will have the same conditions as another branch, only one sensor can be utilized for two such branches. In this embodiment, the sensors are indicated by the reference numeral 182.

As has been noted, the exhaust pulse back effect can be changed for each cylinder in a wide variety of manners in addition to changing the ignition timing as with the previously described embodiment. Some other ways in which this effect can be changed will now be described. It should also be understood that the described methodologies can be used either alone or in various combination with each other, as will be readily apparent to those skilled in the art.

Figure 14:
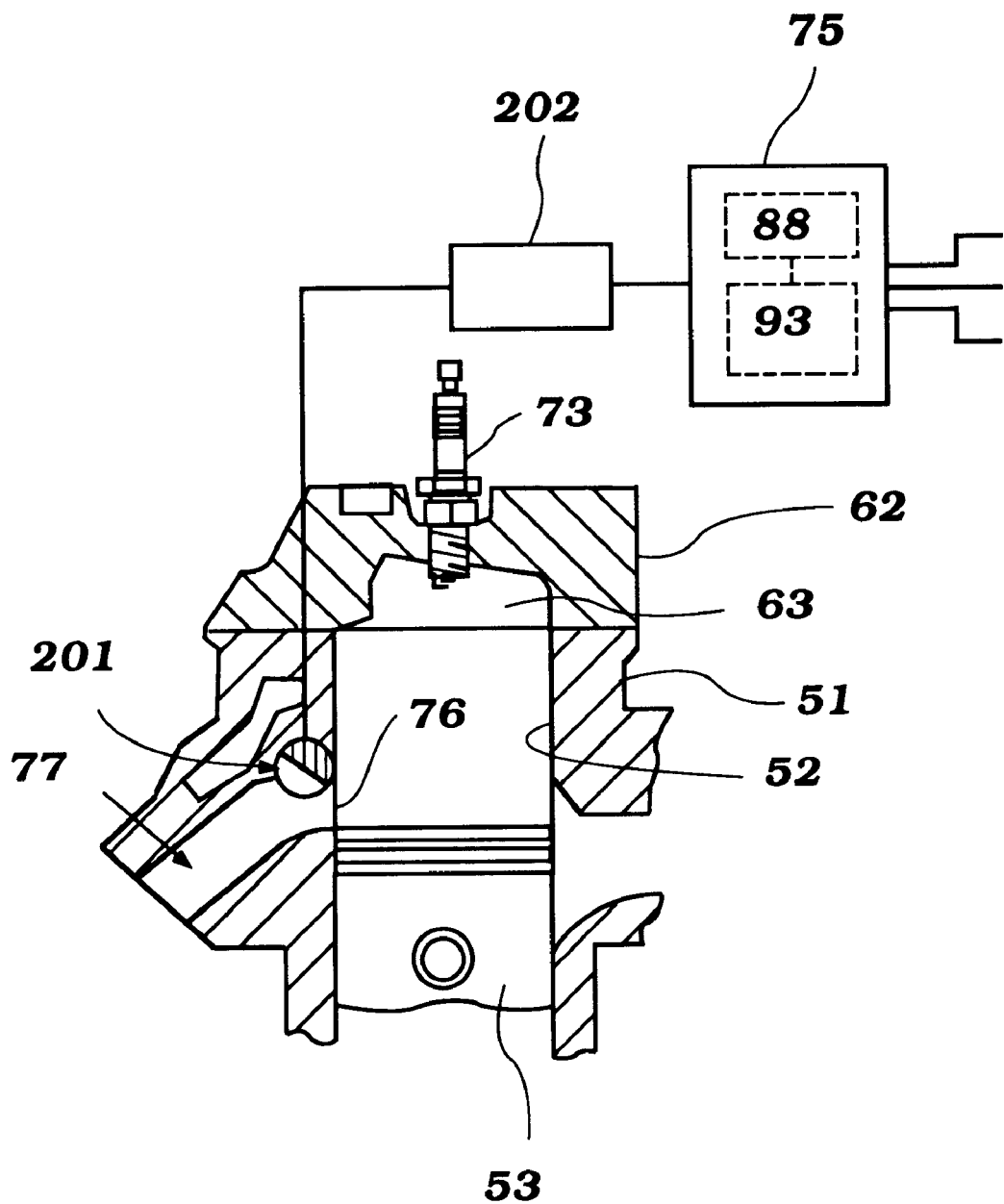
FIG. 14 is a partially schematic cross sectional view showing another form of exhaust effect control.

Referring first to FIG. 14, a single cylinder of an engine is depicted partially in cross-section and its components are identified by the same reference numerals as utilized in conjunction with the embodiment of FIGS. 1–7, where those components are the same or substantially the same.

In this embodiment, the timing of opening of the exhaust port 76 may be varied during engine running by utilizing an exhaust control valve, indicated generally by the reference numeral 201. The exhaust control valve 201 is rotatable in the exhaust passage 77 and by changing its position, the effective compression ratio of the engine can be varied. The exhaust control valve 201 is operated by a servo motor 202 that is controlled by an ECU 75 which receives basically the same input signals as the embodiments previously described.

By changing the effective compression ratio, the exhaust temperature can be adjusted. By raising the compression ratio, the exhaust temperature will become higher while lowering the compression ratio will lower the exhaust temperature. As has been previously noted, the higher temperatures cause more rapid feedback while lower temperatures cause slower feedback of the exhaust pulses.

Figure 15:
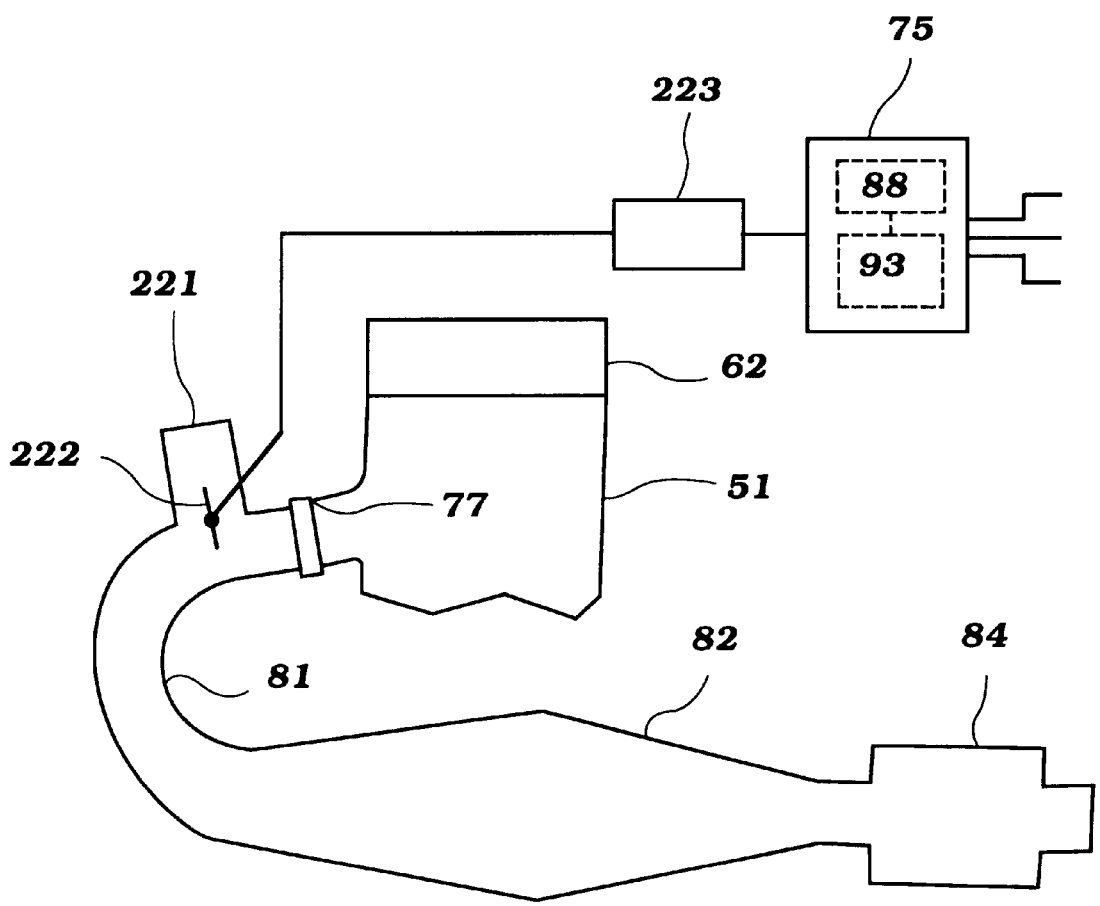
FIG. 15 is a partially schematic view of an engine and exhaust system embodying a different type of engine exhaust effect control.

FIG. 15 shows another embodiment which also has been depicted in only a single cylinder form and again reference numerals corresponding to those previously employed have been utilized to identify common components. In this embodiment, the exhaust pipe portion 81 is provided with a side branch chamber 221 that communicates with the exhaust passage 77 of the engine through a throat in which a control valve 222 is provided. By changing the opening of the control valve 222 a Helmholtz type resonator tuning effect may be obtained which will permit adjustments in the exhaust pipe temperature and accordingly the pulse back conditions.

The control valve 222 is operated by a servo motor 223 which is controlled by the ECU 75 in accordance with a type of strategy as already described.

Figure 16:
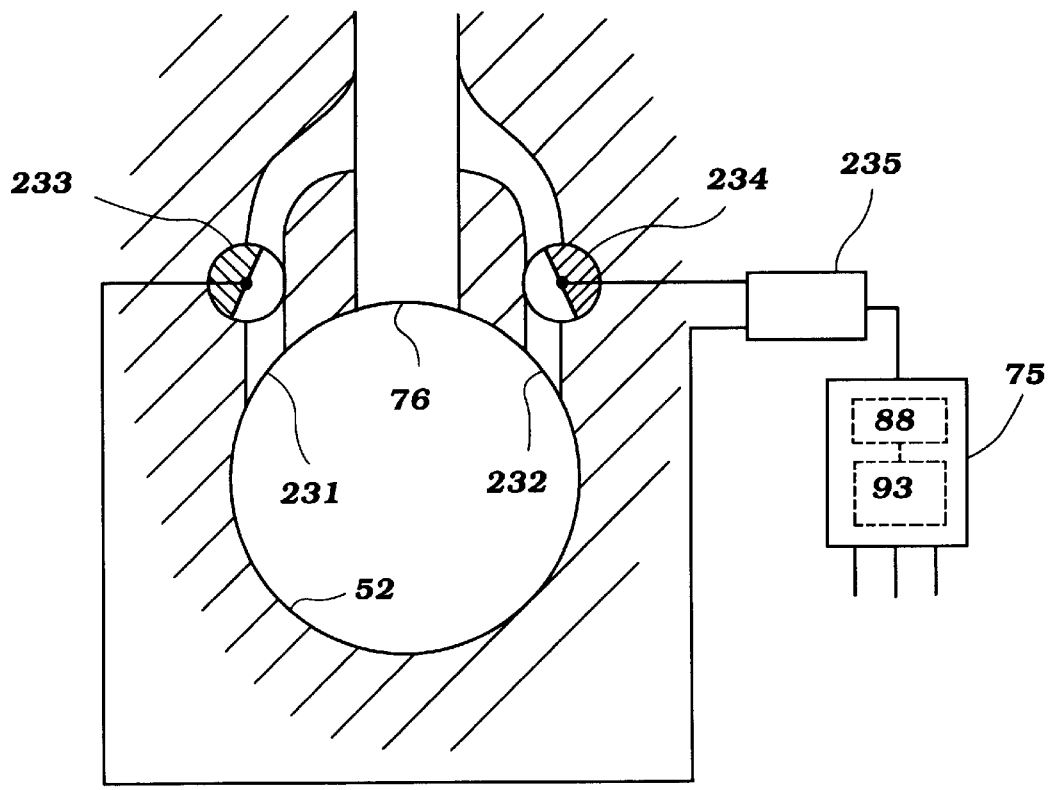
FIG. 16 is a cross sectional view taken through a single cylinder bore of an engine embodying a still further exhaust effect control.

FIG. 16 shows a still further embodiment of the invention wherein the engine is provided with a pair of supplemental exhaust ports 231 and 232 in addition to the main exhaust port 76. Each of the supplemental ports 231 and 232 has a respective exhaust control valve 233 and 234 in it for controlling their opening. These supplemental exhaust ports 231 and 232 may be disposed at different heights in the cylinder bore 52 so as to provide a wider variation in the change in compression ratio and accordingly the exhaust tuning effect. A controller 235 operated by the ECU 75 controls respective servo motors (not shown) that are associated with each of the exhaust control valves 233 and 234 for controlling their timing.

Figure 17:
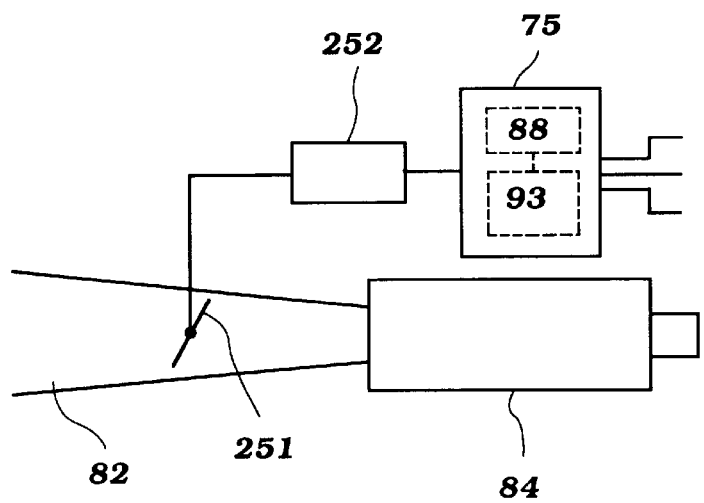
FIG. 17 is a partially schematic side elevational view showing a portion of an exhaust system with yet another type of exhaust effect control.

FIG. 17 shows another embodiment wherein the portion of the downstream end the expansion chamber 82 upstream of the muffler 84 as provided with a reflective exhaust control valve 251. This control valve 251 is operated by a servo motor 252 controlled by the ECU 75 so as to change the reflective effect and accordingly the effective length of the exhaust system.

Figure 18:
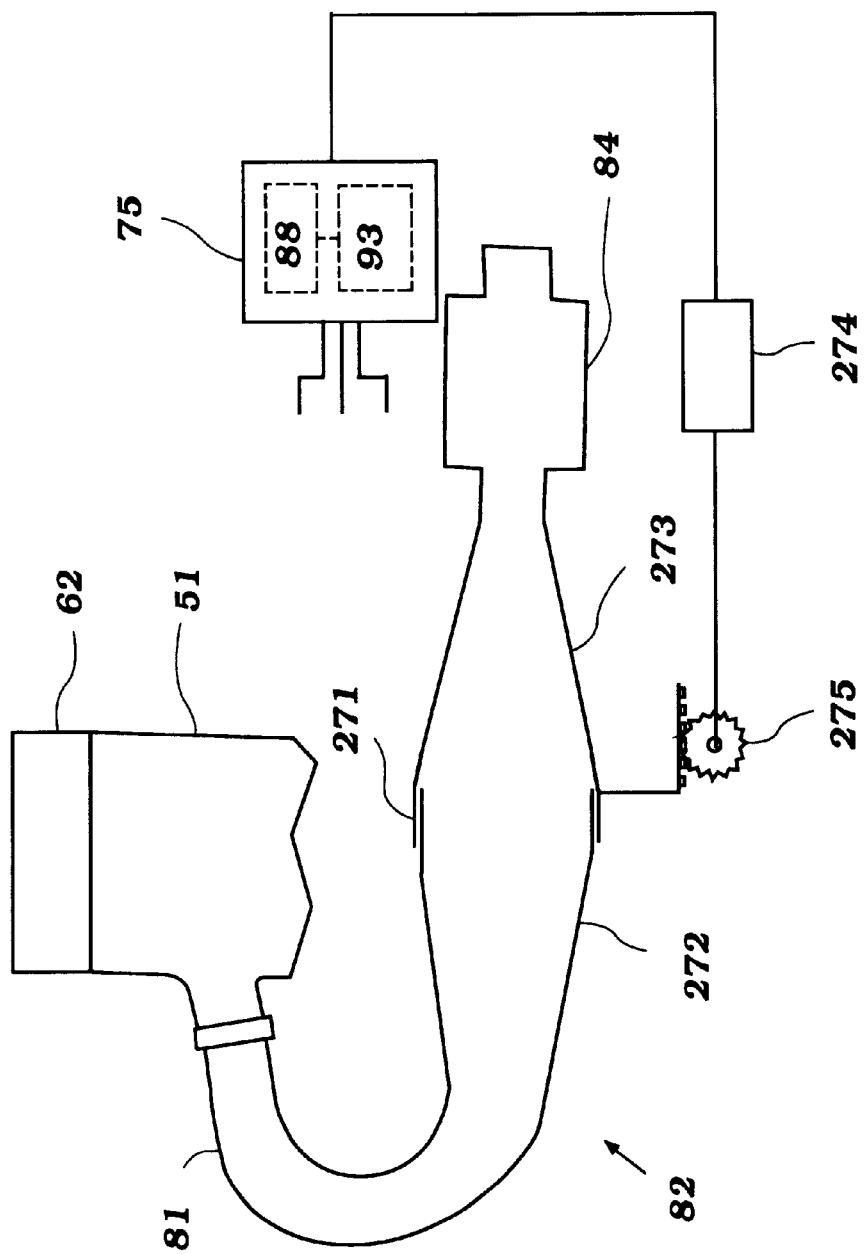
FIG. 18 is a partially schematic side elevational view of an engine and exhaust system with a still further type of exhaust effect control.

FIG. 18 shows a similar embodiment but instead of using a reflective valve, this embodiment utilizes a slip joint 271 in the expansion chamber device 82 by dividing it into two sections 272 and 273 so as to change its effected volume and/or length and thus obtain a variation in the pulse back effect to obtain the desired engine running characteristics. A servo motor 274 controls a gear drive 275 that operates the slip joint 271 to change the effective length and/or volume.

Figure 19:
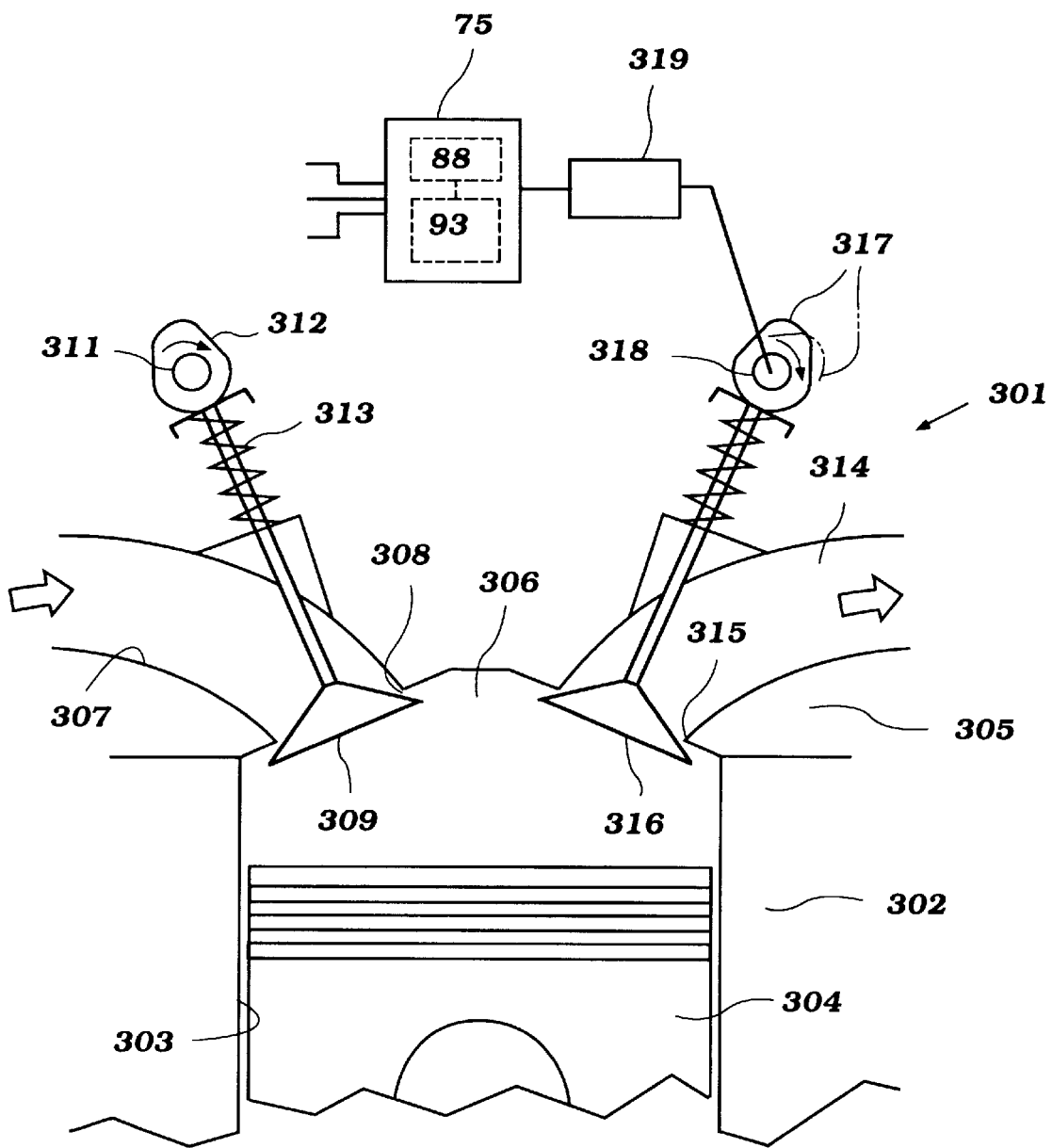
FIG. 19 is a partial cross sectional view taken through a single cylinder of a four cycle engine constructed in accordance with an embodiment of the invention.

The embodiments thus far described have all been embodiments applied to two-cycle crankcase compression engines. Although the invention has been described in conjunction with such applications, as has been noted the invention is capable of use with four-cycle engines also. Such an embodiment is shown in FIG. 19 wherein a portion of a multi-cylinder four-cycle engine constructed and operated in accordance with this embodiment is shown partially and is identified generally by the reference numeral 301. Only the upper portion of the cylinder block and attached cylinder head are shown in this Figure because it is believed that that is all that is required to permit those skilled in the art to understand and practice the invention.

The engine 301 is comprised of a cylinder block 302 that has one or more cylinder bores 303 each of which slidably support a respective piston 304. The pistons 304 are connected in a known manner to drive an output shaft upon reciprocation thereof.

A cylinder head 305 is affixed to the cylinder block 302 in a known manner and has a recess 306 in alignment with the cylinder bores 303. This recess 306 along with the remaining surface of the cylinder head 305, the cylinder bore 303 and the head of the piston 304 form the combustion chamber of the engine. Since the cylinder head recessed recess 306 forms a substantial portion of the clearance volume at top dead center, it will at times be referred to as the combustion chamber.

One or more intake passages 307 extend through one side of the cylinder head 305 and terminate at intake ports 308 which are formed by valve seats. These valve seats are opened and closed by poppet type exhaust valves 309 that are supported for reciprocation in the cylinder head 305 in a well known manner.

A charge of at least air is supplied to the combustion chamber 306 through the intake passage at 307 when the intake valve 309 is open. Fuel may be added to this incoming air charge by a suitable charge former such as a carburetor or manifold injection system. Alternatively, the invention may be utilized with direct cylinder injection.

An intake cam shaft 311 is rotatably journalled in the cylinder head assembly 305 in a known mamner. This cam shaft has lobs 312 that cooperate with the stems of the intake valves 309 for opening them against the action of a closing return springs 313. The intake cam shaft 311 is driven in timed relationship with the engine output shaft at one half speed by any known type of driving mechanism.

The charge which is admitted to the combustion chambers 306 through the induction system described, is fired by one or more spark plugs (not shown) that are mounted in the cylinder head 305 in a well known manner. The burning charge in the combustion chamber 306 will expand and drive the piston 304 downwardly to drive the engine output shaft in a well known manner.

At the completion of the expansion or power stroke, the piston 304 will move upwardly and force the burnt combustion products out of the combustion chamber 306 through one or more exhaust passages 314 formed in the cylinder head 305. These exhaust passages originate at exhaust ports 315 which are formed by valve seats that are valved by a poppet type exhaust valve 316.

The exhaust valves 316, like the intake valves, are operated by cam lobes 317 of an exhaust cam shaft 318. The exhaust cam shaft 318 is journalled for rotation in the cylinder head 305 in a known manner. The exhaust cam shaft 318 is driven by a timing mechanism like the intake cam shaft 311. However, this driving connection includes a variable valve timing mechanism (VVT) for altering the phase angle between the exhaust cam shaft 318 and specifically its lobes 317 and crankshaft.

This VVT mechanism is operated by an actuator 319 so as to move the phase angle of the lobes 317 between a retarded position as shown in solid lines and an advanced position as shown in phantom lines. By advancing the opening of the exhaust valve it is possible to raise the temperature of the exhaust gasses because they will have had less time to cool and thus by changing the valve timing it is possible to control the exhaust gas temperature in accordance to the wall temperature.

Thus, this embodiment also permits the use of exhaust tuning through this system. This tuning control is operated by a control device and maps of the type previously described. Other forms of exhaust tuning may also be employed with four cycle engines including those of the types already described.

The description of the invention as thus far made deals primarily with the positioning of the sensor portion or sensor end 91 of the temperature sensor 89. In addition to its relationship to the flow of exhaust gasses, the positioning of the sensor 89 relative to the vehicle is important. One reason for this is that if the terminal end 92 of the sensor 89 is disposed in contact with the elements, it may itself experience wide temperature fluctuations. These temperature fluctuations will affect the temperature of the sensing end 91 and can also result in poor performance. In addition, the terminal end should be mounted where it is accessible but not where it can be accidentally struck or damaged.

Next will be described a series of embodiments wherein this end of the sensor element, i.e., the terminal end 92 is protected so that it will not come in direct contact with the elements. This will prevent water in the form of rain or snow from contacting it and also will place it in a shielded area where sudden changes in atmospheric temperature will not affect it.

A motorcycle constructed in accordance with these embodiments of the invention is shown in the remaining figures, and is identified generally by the reference numeral 351. For the most part, the motorcycle 351 and the exhaust system is of the type already described. For that reason, those basic components of the motorcycle which are the same or substantially the same as described as well as those of the exhaust system have been identified by the same reference numerals. These components will be described again only insofar as is necessary to understand the construction and operation of this embodiment.

In the figures illustrating the motorcycle 351 a protective body cowling, indicated by the reference numeral 352 is shown either in solid lines or in phantom depending upon the view. This cowling 352 is designed primarily to protect the rider and certain motorcycle components.

The cowling extends from the front of the head pipe 33 and may carry a windshield. It extends downwardly and rearwardly and wraps around the outer part of the frame assembly 32 and extends transversely across and beneath the engine 46. This cowling may be utilized, as will become apparent from the following description, to further protect the sensor 89 and particularly its terminal end 92.

It has been noted that it may be desirable to provide the sensor 89 relatively close to the exhaust ports of the engine. When this is done, the sensor 89 is positioned in the pipe portion 81 and thus may extend partially forwardly of the cowling 352 as shown best in FIGS. 23–25.

In order to protect the sensor 89 and ensure that it will not experience temperature variations or be contacted by the elements, a shield 353 which may be formed from metal is affixed to an outer wall 354 of the exhaust pipe portion 81. This shield 353 extends rearwardly in a cantilevered fashion and defines a gap 355 around the otherwise exposed terminal end 92 of the sensor 89 so as to protect it.

It should be noted that the cantilevered portion extends rearwardly so that the sensor 89 can be accessed from the rear but wherein the sensor will not be positioned so as to receive direct contact of moving air which may bear water or other foreign objects that could damage it or change its temperature to adversely affect the temperature output.

Figure 20:
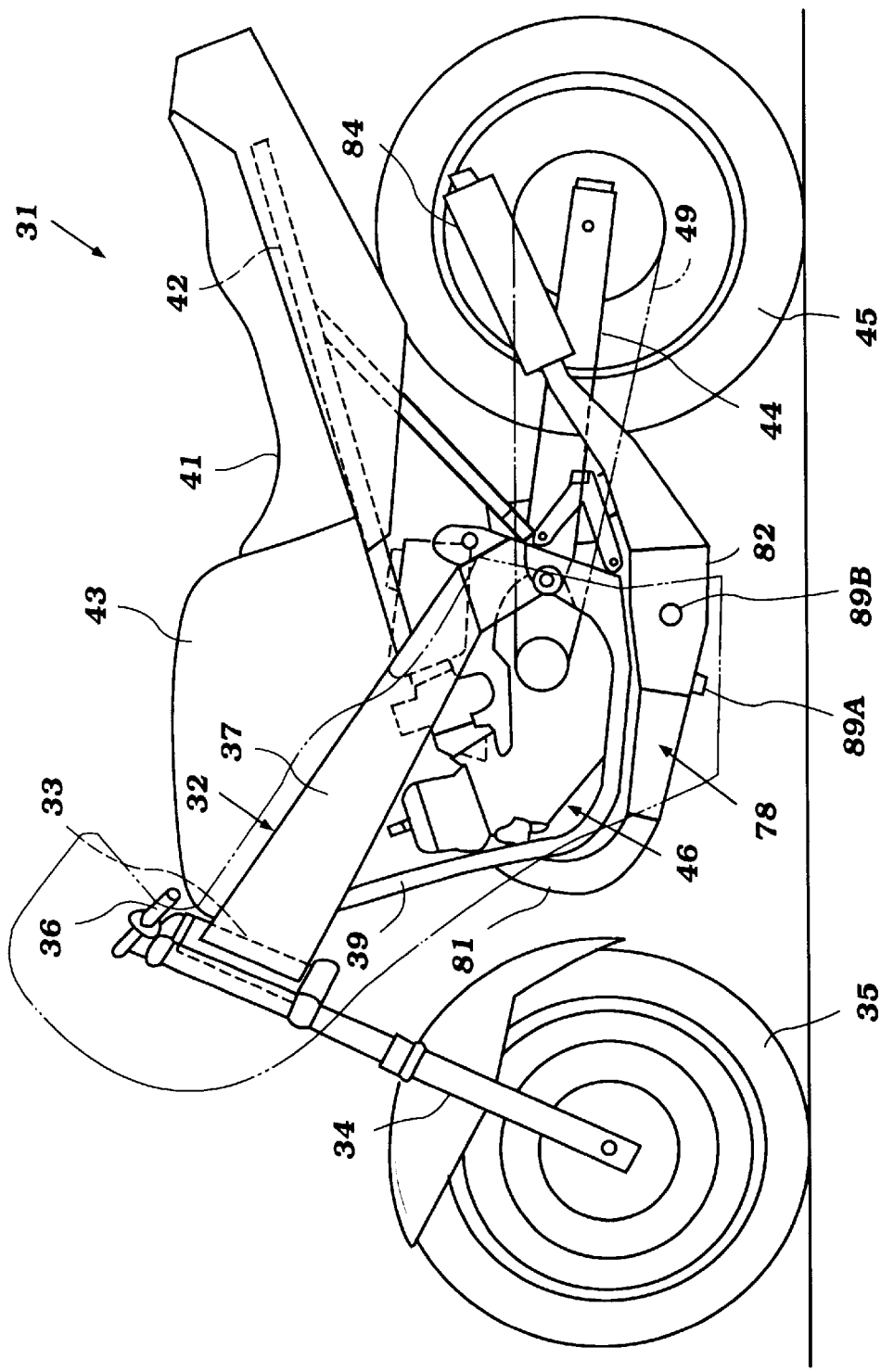
FIG. 20 is a side elevational view of a motorcycle, in part similar to FIG. 1, and shows another series of embodiments of the invention.
Figure 21:
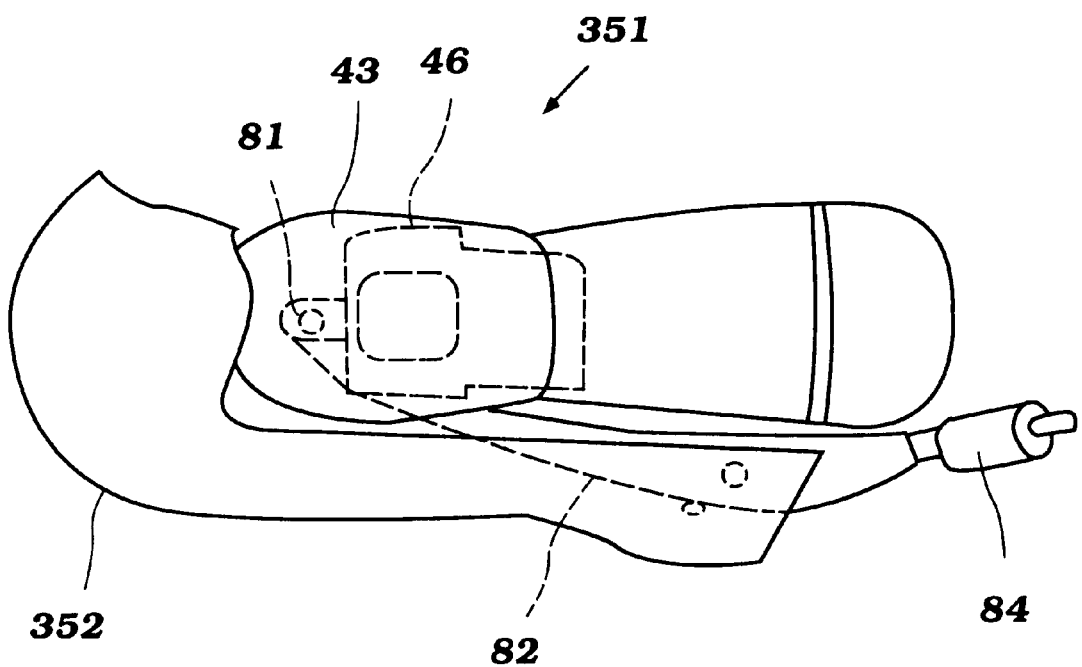
FIG. 21 is a top plan view of certain embodiments.

As shown in FIG. 20, the sensor 89 indicated at 89A may be positioned on the undersigned of the expansion chamber 82 and in the area protected by the cowling 352.

Also, the sensor may be positioned on the side of the expansion chamber 82 in an area still protected by the cowling as seen at 89B.

Figure 22:
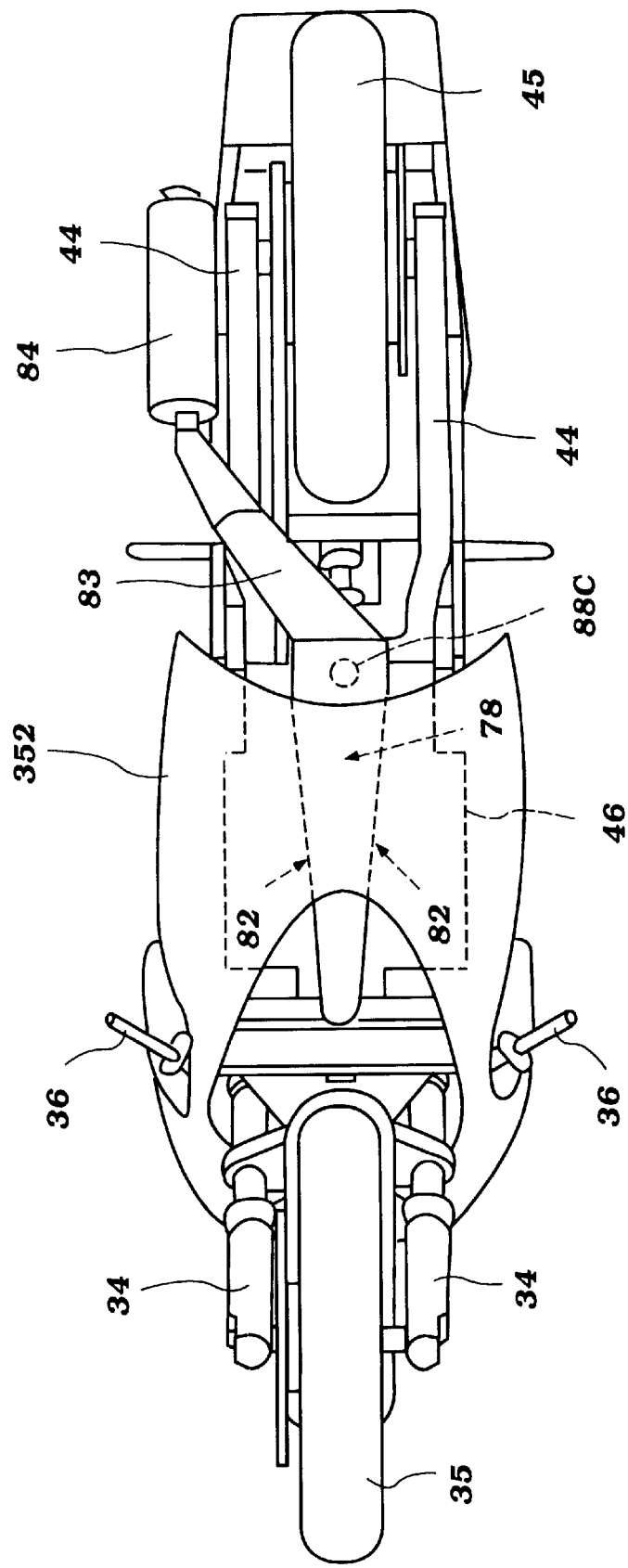
FIG. 22 is a bottom plan view of the motorcycle.

Alternatively, the sensor 89 may be positioned rearwardly of the cowling 352 and on the upper side of the expansion chamber device as seen by the position 89C in FIG. 22. Thus, in this position, the sensor 89 is protected by the engine itself and particularly by the crankcase transmission assembly 47.

It is to be understood that the sensor arrangements utilized in the various locations shown in FIGS. 20–25 may also be positioned in the exhaust pipe in such a way not to be impacted upon the exhaust gas flowing therethrough, particularly if in curved areas.

Thus, from the foregoing description it should be readily apparent that the described embodiments of the invention provide a stable temperature sensing device that permits good engine control without wide fluctuations in performance and which also operate so as to protect the sensor itself from damage or from adverse effects caused by air flowing or foreign objects flowing around the terminal end.

Of course, the foregoing description is that of preferred embodiments of the invention, and various changes and modifications may be made without departing from the spirit and scope of the invention, as defined by the appended claims.

What is claimed is:

1. An internal combustion engine having at least one combustion chamber in which combustion occurs, an exhaust system for discharging exhaust gasses from said combustion chamber through an exhaust pipe to the atmosphere through a discharge opening, exhaust effect control means for effecting the transmission of reflective exhaust gas pulses acting upon said exhaust port from said exhaust pipe, an exhaust temperature sensor having a detector end for detecting temperatures and a terminal end spaced from the detector end for transmitting a control signal for controlling said exhaust effect control means, and means for mounting said exhaust temperature sensor in said exhaust system for sensing the temperature of a wall thereof by said detector end without experiencing conditions that would cause fluctuating signals to be transmitted from said terminal end.

2. An internal combustion engine as set forth in claim 1 wherein the exhaust pipe has a section which curves and the temperature sensor is disposed contiguous to said curved section.

3. An internal combustion engine as set forth in claim 2 wherein the temperature sensor is positioned away from the portion of the curved exhaust pipe section that would experience the direct impact of the exhaust gasses flowing from the engine.

4. An internal combustion engine as set forth in claim 3 wherein the sensor end of the temperature sensor is disposed within a range extending around the portion of the circumference of the exhaust pipe closest to the radius of curvature thereof.

5. An internal combustion engine as set forth in claim 1 wherein the exhaust temperature sensor is mounted in the exhaust system in an area where the terminal end is protected from air flow thereacross.

6. An internal combustion engine as set forth in claim 5 wherein the terminal end of the sensor element is protected by a rigid body that extends across said terminal end.

7. An internal combustion engine as set forth in claim 6 wherein the rigid body is directly affixed to the exhaust pipe.

8. An internal combustion engine as set forth in claim 7 wherein the rigid body is affixed to the exhaust pipe in a direction upstream of the flow of exhaust gasses through the exhaust pipe.

9. An internal combustion engine as set forth in claim 6 wherein the engine powers a vehicle and a portion of the vehicle forms the rigid body.

10. An internal combustion engine as set forth in claim 9 wherein the vehicle body portion comprises a protective cowling of the body.

11. An internal combustion engine as set forth in claim 9 wherein the vehicle rigid body portion is formed by the engine.

12. An internal combustion engine as set forth in claim 1 wherein the exhaust effect control means changes the pulse back effect on the exhaust port by changing the timing of ignition in the combustion chamber.

13. An internal combustion engine as set forth in claim 1 wherein the exhaust effect control means changes the pulse back effect on the exhaust port by changing the timing of opening of the exhaust port.

14. An internal combustion engine as set forth in claim 1 wherein the exhaust effect control means changes the pulse back effect on the exhaust port by changing the effective length of the exhaust pipe.

15. An internal combustion engine as set forth in claim 14 wherein the exhaust effect control means changes the effective length of the exhaust pipe by actually changing the length of the exhaust pipe.

16. An internal combustion engine as set forth in claim 14 wherein the exhaust effect control means changes the effective length of the exhaust pipe by operating a reflective valve in the exhaust system.

17. An internal combustion engine as set forth in claim 1 wherein the exhaust effect control means changes the pulse back effect on the exhaust port by changing the effective volume of the exhaust system.

18. An internal combustion engine as set forth in claim 1 wherein the exhaust effect control means changes the pulse back effect on the exhaust port by selectively communicating a timing device with the exhaust system.

* * * * *